United States Patent
Ghafouri et al.

(10) Patent No.: US 12,494,125 B2
(45) Date of Patent: Dec. 9, 2025

(54) ASSERTIVE VEHICLE DETECTION MODEL GENERATION

(71) Applicant: GM Cruise Holdings LLC, San Francisco, CA (US)

(72) Inventors: Amin Ghafouri, San Francisco, CA (US); Prasanth Palli, South San Francisco, CA (US); Jeremy Allan, Menlo Park, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 81 days.

(21) Appl. No.: 17/894,074

(22) Filed: Aug. 23, 2022

(65) Prior Publication Data

US 2022/0410900 A1 Dec. 29, 2022

Related U.S. Application Data

(63) Continuation of application No. 16/700,825, filed on Dec. 2, 2019, now Pat. No. 11,433,892.

(51) Int. Cl.
*G08G 1/16* (2006.01)
*B60W 30/18* (2012.01)
(Continued)

(52) U.S. Cl.
CPC ....... *G08G 1/166* (2013.01); *B60W 30/18154* (2013.01); *B60W 40/04* (2013.01);
(Continued)

(58) Field of Classification Search
CPC ..... B60W 30/18154; B60W 30/18159; B60W 40/04; B60W 50/0097; B60W 60/0027; B60W 60/00272; B60W 60/00276; B60W 2552/53; B60W 2555/60; B60W 2554/40; B60W 2554/4045; B60W 2554/4046; B60W 2554/80; G08G 1/166; G06N 3/08; G06N 5/01; G06N 7/01; G06N 20/00; G06N 20/10; G06N 20/20; G06F 18/24;
(Continued)

(56) References Cited

U.S. PATENT DOCUMENTS 7,639,159 B2 12/2009 McNew et al.
8,027,762 B2 9/2011 Otake et al.
(Continued)

OTHER PUBLICATIONS

International Search Report and Written Opinion for PCT Application PCT/US2019/068852, International Filing Date Dec. 28, 2019, Date of Mailing Oct. 6, 2020, 13 pages.
(Continued)

*Primary Examiner* — Brandon Z Willis
(74) *Attorney, Agent, or Firm* — CANTOR COLBURN LLP

(57) ABSTRACT

There is disclosed herein examples of system and procedure for generating a model to be implemented within autonomous vehicles for identifying assertive vehicles at an intersection having stop indicators. The model can be generated via data-driven procedure where captures of the movement of vehicles through an intersection are analyzed and utilized for generating the model. The model may be provided to the autonomous vehicles and may be implemented by the autonomous vehicles for identifying assertive vehicles.

19 Claims, 11 Drawing Sheets

(51) Int. Cl.
*B60W 40/04* (2006.01)
*G05D 1/00* (2024.01)
*G06N 20/20* (2019.01)
*G06V 20/56* (2022.01)
*G06V 20/58* (2022.01)

(52) U.S. Cl.
CPC ........... *G05D 1/0088* (2013.01); *G06N 20/20* (2019.01); *G06V 20/56* (2022.01); *G06V 20/58* (2022.01); *G06V 20/584* (2022.01); *B60W 2554/80* (2020.02); *B60W 2555/60* (2020.02)

(58) Field of Classification Search
CPC ...... G06F 18/25; G06V 10/70; G06V 20/182; G06V 20/56; G06V 20/58; G06V 20/588; G06V 20/584; G05D 1/0088
See application file for complete search history.

(56) References Cited

U.S. PATENT DOCUMENTS

| | | | |
|---|---|---|---|
| 9,218,739 B2 | 12/2015 | Trombley et al. | |
| 9,865,162 B2 | 1/2018 | Kurotobi et al. | |
| 10,304,337 B2 * | 5/2019 | Ando | B60W 30/09 |
| 10,514,694 B1 | 12/2019 | Mundhenk et al. | |
| 10,684,626 B1 * | 6/2020 | Martin | G08G 1/0962 |
| 2008/0068146 A1 * | 3/2008 | Cauldwell | G08G 1/166 340/435 |
| 2014/0236414 A1 | 8/2014 | Droz et al. | |
| 2017/0131719 A1 * | 5/2017 | Micks | G05D 1/0246 |
| 2017/0190334 A1 * | 7/2017 | Zelman | G08G 1/163 |
| 2019/0088135 A1 * | 3/2019 | Do | B60W 50/14 |
| 2019/0287395 A1 * | 9/2019 | Aoude | G08G 1/0116 |
| 2019/0299984 A1 | 10/2019 | Shalev-Shwartz et al. | |
| 2020/0388156 A1 | 12/2020 | Aoude et al. | |
| 2021/0125076 A1 * | 4/2021 | Zhang | G08G 1/0137 |
| 2021/0125078 A1 * | 4/2021 | Malhan | G06N 3/042 |
| 2022/0126863 A1 * | 4/2022 | Moustafa | G06T 9/00 |

OTHER PUBLICATIONS

Woo, C. "Driving Manoeuvre Recognition Using Mobile Sensors," Waterloo, Ontario, Canada; 128 pages, Aug. 31, 2016.

* cited by examiner

| Model | Precision | Recall |
|---|---|---|
| Logistic Regression | 0.792 | 0.844 |
| SVM | 0.841 | 0.896 |
| Feedforward Neural Network | 0.839 | 0.883 |
| Random Forest | 0.822 | 0.961 |

FIGURE 8

ASSERTIVE VEHICLE DETECTION MODEL GENERATION

PRIORITY APPLICATION

The present application is a Continuation Patent Application claiming priority to U.S. Non-Provisional application Ser. No. 16/700,825 having the same title and filed on Dec. 2, 2019 (the '825 Application). The '825 Application is hereby incorporated by reference in its entirety.

TECHNICAL FIELD

The present disclosure relates generally to autonomous vehicles and, more specifically, to devices and methods that produce a model for autonomous vehicles for identifying assertive vehicles.

BACKGROUND

As transportation technology has developed, autonomous vehicles have developed. An autonomous vehicle may have a control system that can control movement of the autonomous vehicle, cooperate with a user to control movement of the vehicle, assist a user in controlling movement of the vehicle, or some combination thereof. The autonomous vehicle can detect environmental objects surrounding the vehicle and the control system can utilize the detected environmental objects for control of the movement of the vehicle.

BRIEF DESCRIPTION OF THE DRAWINGS

The following figures are provided with accompanying description to provide some examples for the understanding of the subject matter disclosed herein. A component may be labeled with a same reference numeral throughout the drawings to indicate that the component is the same component or includes the same features with other components labeled with the same reference numeral throughout the drawings where the same reference numeral is utilized.

FIG. 8 illustrates example precision-recall metrics that may be produced based on the testing of the generated models, according to embodiments described herein.

DETAILED DESCRIPTION

Figure 1:
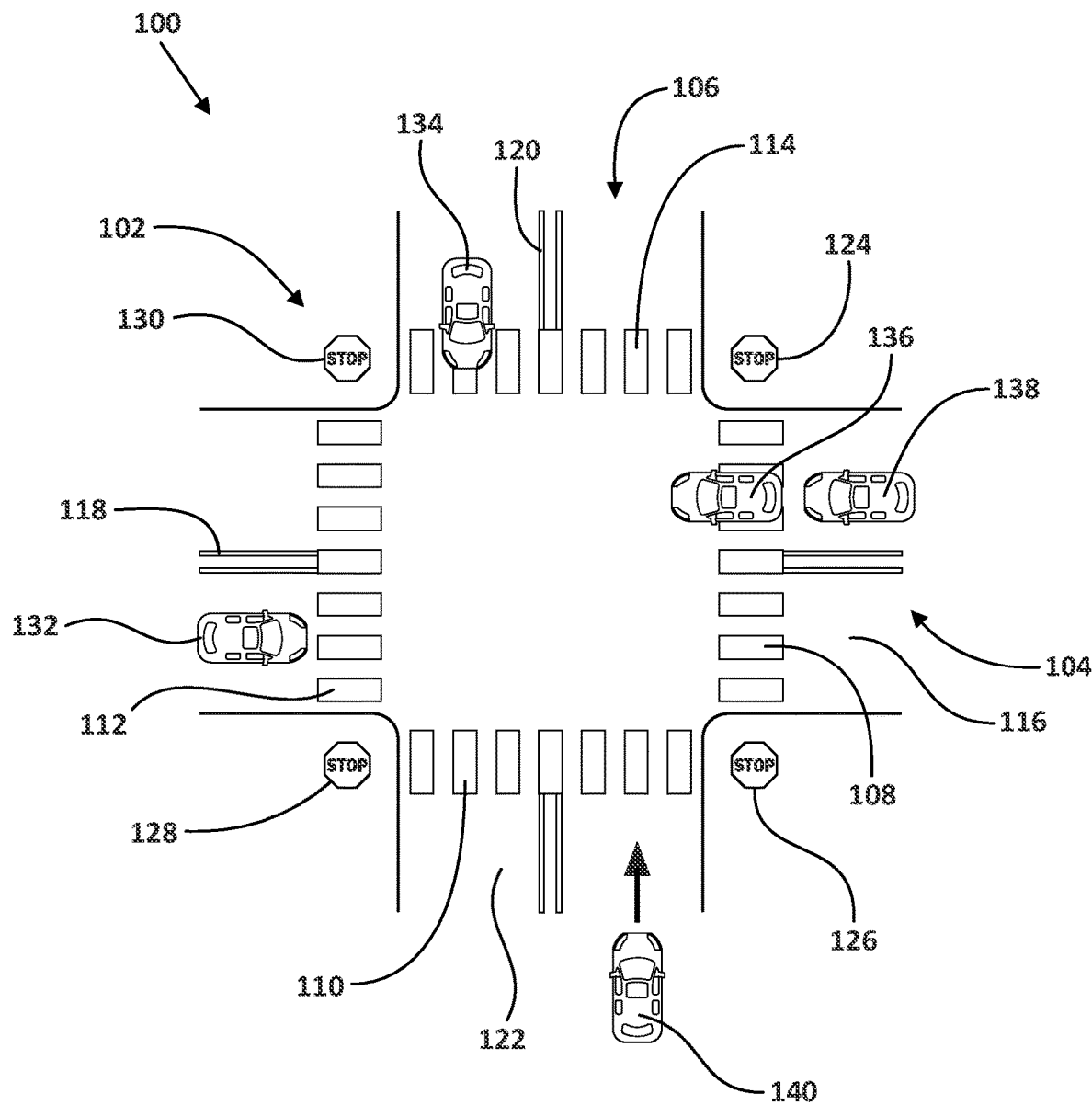
FIG. 1 illustrates an example intersection arrangement, according to embodiments described herein.

The following description and accompanying drawings provide some examples illustrating features of the subject matter described herein. The subject matter relates generally to autonomous vehicles and, more specifically, to devices and methods that produce a model for autonomous vehicles for identifying assertive vehicles.

Generally, autonomous vehicles will take in data related to surroundings and determine an action (such as causing the autonomous vehicle to move or stop) to be performed based on the data. For example, the autonomous vehicles described herein may capture data related to a street on which the autonomous vehicle is travelling and other vehicles around the autonomous vehicle, and may plan a route (including actions to be performed) based on the captured data.

While the actions of the autonomous vehicle can be planned, movement of other vehicles may be less predictable. While rules of the road (such as laws and/or commonly accepted practices) can be utilized at times for predicting movement of other vehicles in some instances, it can be less predictable whether the other vehicles will follow the actions defined by the rules. When another vehicle does not follow the actions defined by the rules of the road, the autonomous vehicle may have to change a planned route and/or planned actions to compensate for the actions performed by the vehicle not following the rules of the road.

One instance that presents a possibility of other vehicles violating the rules of the road is at stop indicators (such as stop signs, flashing red lights, or other indicators that indicate the vehicle should stop). In particular, other vehicles may proceed out of an order defined by the rules. A vehicle proceeding out of order can cause a planned route of the autonomous vehicle and a planned time for the autonomous vehicle to proceed along the route to intersect with the movement of the other vehicle in some instances when the autonomous vehicle does not compensate for the movement of the vehicle proceeding out of order. Legacy control systems for autonomous vehicles have trouble identifying when other vehicles are going to proceed out of order and, therefore, may have trouble properly compensating for the movement of the other vehicles.

Embodiments described herein can produce a model that can be utilized by autonomous vehicles to more reliably identify when other vehicles are going to proceed out of order. For example, a procedure for generating a model may include utilizing data captured by autonomous vehicles regarding movement of other vehicles at stop indicators and generating the model based on the data. The systems described herein may determine characteristics of the movement of the other vehicles from the data. When a vehicle is determined to have proceeded out of turn (which may be referred to as "asserting" throughout this disclosure), the system may determine characteristics (such as velocity, acceleration, position, etc.) of the vehicle within the area of the stop indicator and utilize the characteristics to identify characteristics that indicate that the vehicle was likely to proceed out of turn. Determining the characteristics from multiple vehicles indicating that the vehicles were likely to proceed out of turn can be utilized to generate a model that can be implemented in autonomous vehicles to predict when vehicles are likely to proceed out of turn during real-time operation of the autonomous vehicles, which can facilitate proper actions to be taken by the autonomous vehicles based on a likelihood that a vehicle is going to proceed out of turn. This data-driven approach for generating and implementing a model within autonomous vehicles may improve the reliability of identifying vehicles proceeding out of turn as compared to legacy approaches utilized in legacy control systems for autonomous vehicles.

As will be appreciated by one skilled in the art, features described herein may be embodied in various manners—e.g. as a method, a device, a system, a computer program product, a computer-readable medium, and/or other manners. Accordingly, features described herein may take the form of entirely hardware embodiments, entirely software embodiments (such as being implemented as one of more of firmware, resident software, micro-code, or other software implementations) or embodiments combining software and hardware aspects. Features of the subject matter described in the present disclosure may take the form of a computer program product. For example, the features may be implemented as instructions (such as program code) stored on one or more computer-readable medium(s) (such as non-transitory, computer-readable medium(s)) or one or more computer-readable medium(s) having instructions stored thereon, where the instructions, in response to execution by a device (such as a computer), cause the device to perform one or more operations. In various embodiments, the instructions may be stored on the computer-readable medium(s) during manufacturing of the computer-readable medium(s), or may be stored on the computer-readable medium(s) after manufacture of the computer-readable medium(s), including when the computer-readable medium(s) have been implemented within a device.

FIG. 1 illustrates an example intersection arrangement 100, according to embodiments described herein. The intersection arrangement 100 shows a particular intersection arrangement 100 that may be encountered by an autonomous vehicle. An autonomous vehicle can capture characteristics of the intersection arrangement 100. The captured characteristics, or some portion thereof, may be utilized for generating a model for identifying assertive vehicles and/or may be utilized by the autonomous vehicle for identifying assertive vehicles based on a model implemented by the autonomous vehicle.

The intersection arrangement 100 includes an intersection 102 between two or more roads, such as highways. In the illustrated embodiment, a first road 104 and a second road 106 intersect to form the intersection 102. The intersection 102 may include a portion that is shared by the first road 104 and the second road 106. In some embodiments, the intersection 102 may further include objects of the roads related to the shared portion, such as crosswalks and/or stop lines. In the illustrated embodiment, the intersection 102 includes a first crosswalk 108, a second crosswalk 110, a third crosswalk 112, and a fourth crosswalk 114. A first portion 116 of the first road 104 extends from a side of the intersection 102 and a second portion 118 of the first road 104 extends from an opposite side of the intersection 102 in the illustrated embodiment. Further, a first portion 120 of the second road 106 extends from a side of the intersection 102 and a second portion 122 of the second road 106 extends from an opposite side of the intersection 102. While the illustrated embodiment shows two roads intersecting, it should be understood that more than two roads may intersect to form an intersection in other embodiments. Further, while the roads extend through the intersection in the illustrated embodiment, it should be understood that one or more of the roads may end at an intersection in other embodiments, where each of the roads that end at the intersection extend from the intersection at a single side of the intersection.

The way that vehicles are to proceed through the intersection 102 may be defined by the rules of the road and/or characteristics of the intersection 102. For example, the intersection 102 can include one or more stop indicators directed toward one or more of the roads where the stop indicators indicate that vehicles approaching from the direction corresponding to the one or more stop indicators are to stop at an edge of the intersection 102 prior to entering the intersection 102. For example, the stop indicators can indicate that the vehicles are to stop at a corresponding stop line or a crosswalk at the edge of the intersection 102.

Some examples of stop indicators include stop signs, flashing red lights, and stop lines. The intersection 102 includes a first stop sign 124, a second stop sign 126, a third stop sign 128, and a fourth stop sign 130 in the illustrated embodiment. The first stop sign 124 is directed to the first portion 116 of the first road 104 in the illustrated embodiment and indicates that vehicles approaching from the first portion 116 should stop at the edge of the intersection 102. The second stop sign 126 is directed to the second portion 122 of the second road 106 in the illustrated embodiment and indicates that vehicles approaching from the second portion 122 should stop at the edge of the intersection 102. The third stop sign 128 is directed to the second portion 118 of the first road 104 in the illustrated embodiment and indicates that vehicles approaching from the second portion 118 should stop at the edge of the intersection 102. The fourth stop sign 130 is directed to the first portion 120 of the second road 106 in the illustrated embodiment and indicates that vehicles approaching from the first portion 120 should stop at the edge of the intersection 102. While the illustrated embodiment includes stop indicators directed to all the directions from which vehicles can approach, stop indicators may be directed to less than all the directions from which vehicles can approach in other embodiments.

The intersection arrangement 100 may include one or more vehicles, where one or more of the vehicles can be autonomous vehicles. The vehicles may include cars, trucks, buses, motorcycles, bicycles, scooters, other modes of transportation that may utilize roads for travel, or some combination thereof. In the illustrated embodiment, the intersection arrangement 100 includes an autonomous vehicle 132 located at the edge of intersection 102 on the second portion 118 of the first road 104. Further, the intersection arrangement 100 includes a first vehicle 134 approaching from the first portion 120 of the second road 106, a second vehicle 136 and a third vehicle 138 approaching from the first portion 116 of the first road 104, and a fourth vehicle 140 approaching from the second portion 122 of the second road 106. In other embodiments, there may be more or less vehicles included in the intersection arrangement 100 and the vehicles may approach from all, or less than all, the portions of the roads.

The autonomous vehicle 132 may include a control system with one or more sensors that are capable of capturing the surroundings of the autonomous vehicle 132. The sensors of the autonomous vehicle 132 can capture information regarding the roads, the intersection 102, the stop signs, and the other vehicles, and the information can be stored as data. For example, the sensors can capture images of the surroundings and can determine distances to objects within the surroundings, including the intersection 102, the stop signs, and/or the vehicles. The sensors can capture the images and determine the distances at set intervals, such as every 0.1 seconds in some embodiments. Based on the data captured by the sensors, the control system can derive one or more characteristics of the surroundings, such as the locations of objects relative to other objects, velocities at which the objects are travelling, and/or accelerations of the objects. In some embodiments, the autonomous vehicle 132 may be wirelessly coupled to a server or other device and can provide the data and the derived characteristics for storage on one or more memory devices of the server or other device.

Figure 2:
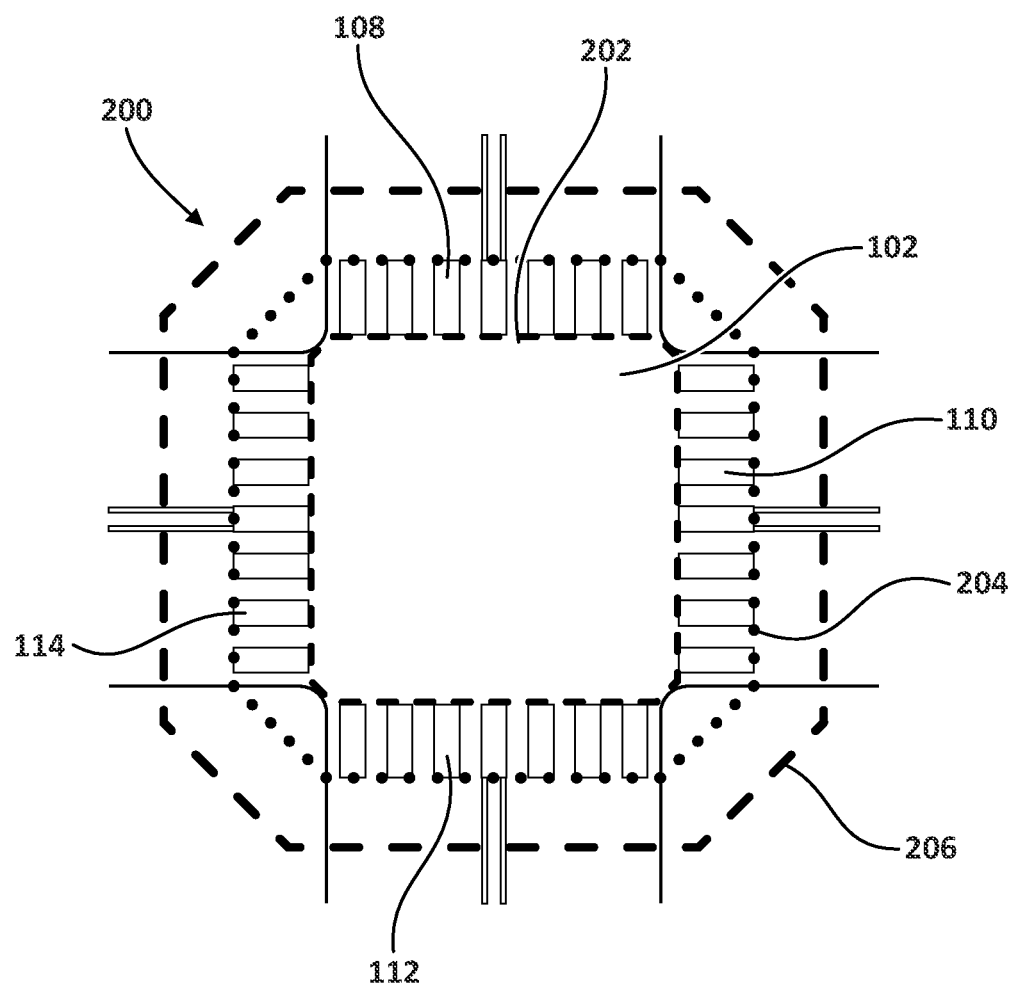
FIG. 2 illustrates an example of an interest zone, according to embodiments described herein.

FIG. 2 illustrates an example of an interest zone 200, according to embodiments described herein. In particular, the interest zone 200 illustrated can be an interest zone corresponding to the intersection 102. The interest zone 200 is overlaid over the intersection 102 to show the relationship between the interest zone 200 and the intersection 102. In other embodiments, the interest zone 200 may correspond to other intersections.

The interest zone 200 may comprise an interior zone 202, an intersection zone 204, and a buffer zone 206. Each of the interior zone 202, the intersection zone 204, and the buffer zone 206 can correspond to the intersection 102. The interest zone 200 may define an area for which data is considered when generating one or more models for identifying assertive vehicles. In particular, data relating to the objects, or some portion thereof, at least partially within the area defined by the interest zone 200 may be utilized for generating the one or more models for identifying assertive vehicles.

The interior zone 202 may extend over a portion of the intersection 102. In particular, the interior zone 202 may extend over the portion of the intersection 102 that does not include the crosswalks. For example, the interior zone 202 may extend among and up to an inner edge of the first crosswalk 108, the second crosswalk 110, the third crosswalk 112, and the fourth crosswalk 114. The interior zone 202 may include the portions of the intersection 102 where the vehicles moving through the intersection are expected to cross paths. In other embodiments, the interior zone 202 may extend among and up to an inner edge of stop lines of an intersection and/or be in line between the intersection points at the edge of the roads.

The intersection zone 204 may extend over the intersection 102. In particular, the intersection zone 204 may extend over the intersection 102, including the crosswalks. For example, the intersection zone 204 may extend among and include the first crosswalk 108, the second crosswalk 110, the third crosswalk 112, and the fourth crosswalk 114. The intersection zone 204 may further encompass the interior zone 202. In other embodiments, the intersection zone 204 may extend among and include the stop lines of an intersection and/or be in line between the intersection points at the edge of the roads.

The buffer zone 206 may extend around the intersection zone 204 and extend outwards a certain distance from the intersection zone 204. Accordingly, the buffer zone 206 may extend outwards a certain distance from outer edges of the first crosswalk 108, the second crosswalk 110, the third crosswalk 112, and the fourth crosswalk 114. For example, the buffer zone 206 may extend three meters from the intersection zone 204 in some embodiments. In other embodiments, the buffer zone 206 may extend at less or greater distances from the intersection zone 204. In some embodiments, the buffer zone 206 may be omitted.

Figure 3:
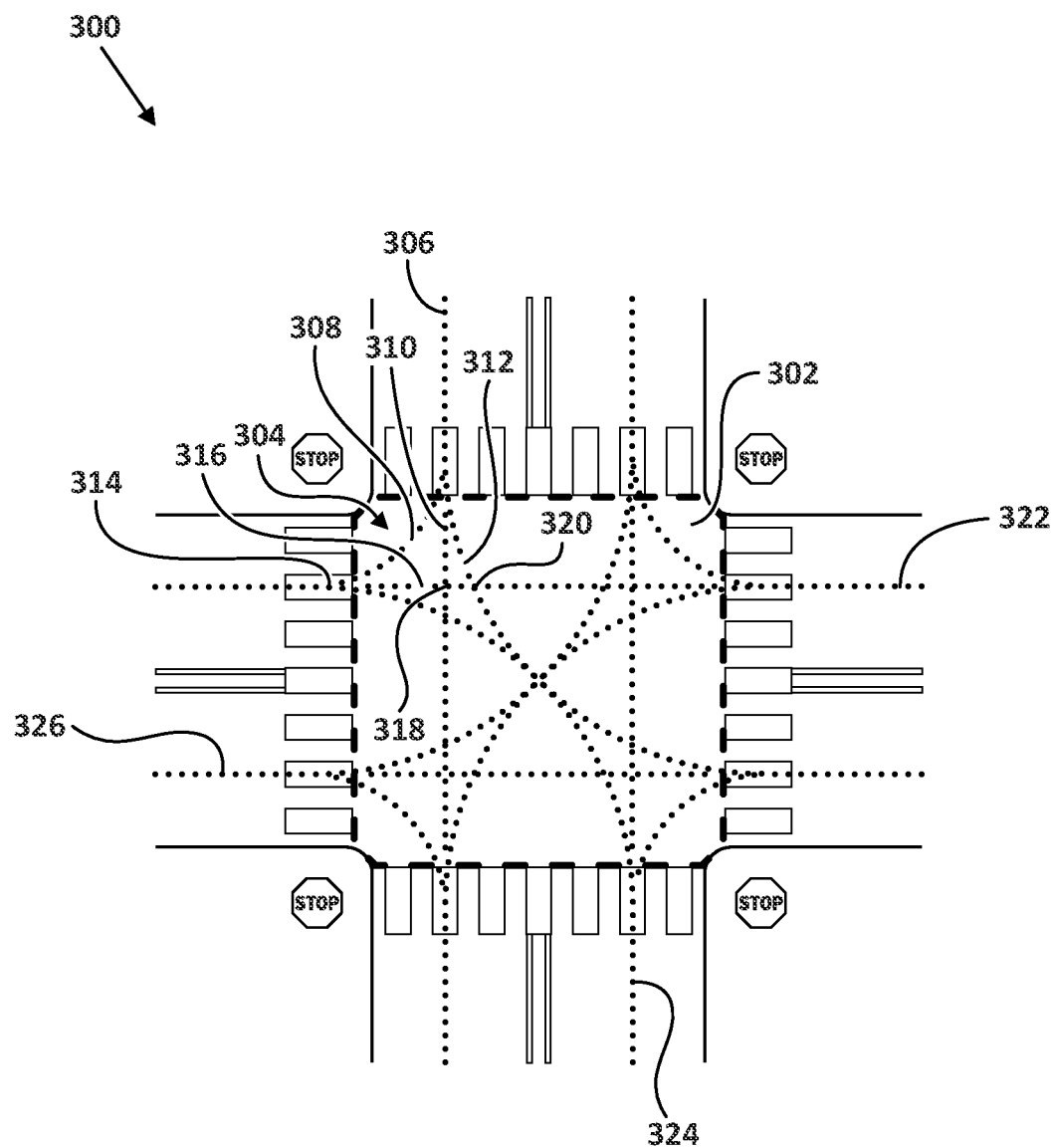
FIG. 3 illustrates an example path diagram, according to embodiments described herein.

FIG. 3 illustrates an example path diagram 300, according to embodiments described herein. The path diagram 300 may illustrate a plurality of paths that may be travelled by vehicles through an intersection 302. The intersection 302 may comprise the intersection 302 (FIG. 3) in some instances.

The path diagram 300 may be generated by an analysis system (such as the analysis system 704 (FIG. 7)). The analysis system may identify lanes and directions in which vehicles can approach the intersection 302. Based on the identified lanes and directions, the analysis system may determine the plurality of paths 304 that may be travelled by vehicles through the intersection 302. The plurality of paths 304 may be produced based on paths of travel of vehicles through the intersection 302 previously captured by an autonomous vehicle and/or other means of capturing images of vehicle travel through the intersection 302 (such as photo captures and/or video captures). In other embodiments, the plurality of paths 304 may be produced based on predicted paths that the vehicles may proceed through the intersection 302. The analysis system may overlay each of the plurality of paths 304 over the intersection 302 to generate the path diagram 300.

The analysis system may analyze the plurality of paths 304 to identify points where the paths intersect. The analysis system may identify one or more threshold positions based on where the paths intersect. In particular, the threshold positions for each entry path may comprise the points of intersection closest to entry path for each of the paths corresponding to the entry path. In other embodiments, the threshold positions may comprise areas encompassing the points where the paths intersect closest to the corresponding entry path and within a certain distance of the points where the paths intersect. For example, each of the threshold positions may comprise an area with a one meter radius around a corresponding point where the paths intersect.

For example, the analysis system may identify a first entry path 306. The first entry path 306 may be a trajectory that a vehicle approaching the intersection 302 may proceed upon. The first entry path 306 may extend along a lane of a road approaching from a first direction to the intersection 302. The analysis system may further identify a first path 308, a second path 310, and a third path 312 extending from the first entry path 306 that vehicles may travel upon. The first path 308 may correspond to a right turn from the first entry path 306, the second path 310 may correspond to a straight line of travel from the first entry path 306, and the third path 312 may correspond to a left turn from the first entry path 306. The analysis system may identify a first point of intersection 314 where the first path 308 intersects with a fourth path 316. Further, the analysis system may identify a second point of intersection 318 where the second path 310 intersects with the fourth path 316. The analysis system may also identify a third point of intersection 320 where the third path 312 intersects with the fourth path 316. Based on the identified points of intersection, the analysis system may define a first threshold position at the first point of intersection 314, a second threshold position at the second point of intersection 318, and a third threshold position at the third point of intersection 320 in the illustrated embodiment. Each of the first threshold position, the second threshold position, and the third threshold position may comprise the corresponding point of intersection or an area encompassing the corresponding point of intersection depending on the embodiment. The three threshold positions may comprise the threshold positions for a vehicle entering the intersection 302 along the first entry path 306.

In some embodiments, the remote system may identify all the points of intersection of the paths corresponding to an entry path with other paths and may define the threshold positions based on all the points of intersection. The remote system and/or an autonomous vehicle utilize a portion of the threshold positions that correspond to vehicles located at the intersection 302. For example, when a vehicle is approaching the intersection 302 via the first entry path 306 and another vehicle is approaching the intersection 302 via the fourth entry path 326, the remote system and/or the autonomous vehicle may utilize the portion of the threshold positions defined based on intersections between the paths related to the first entry path 306 and the paths related to the fourth entry path 326.

For brevity, the first entry path 306 and corresponding threshold positions have been described. It is to be understood that each position from which a vehicle is intended to enter the intersection may include an entry path. For example, the path diagram 300 of the illustrated embodiment includes the first entry path 306, a second entry path 322, a third entry path 324, and a fourth entry path 326. In other embodiments, path diagrams may include more or fewer entry paths. Further, while the illustrated embodiment shows a single entry path from each direction that vehicles may enter the intersection 402, it is to be understood that there may be more than one entry path from one or more of the directions. For example, in instances where one or more of the roads abutting the intersection 402 has a plurality of lanes along which the vehicles may enter the intersection 402, each lane of the plurality of lanes may have an entry path that extends along the lane.

Further, it should be understood that each entry path may have one or more corresponding threshold positions, which may be determined by the analysis system according to the described procedure for determining the threshold positions for the first entry path 306. For example, the analysis system may utilize the described procedure to determine threshold positions for the second entry path 322, the third entry path 324, and the fourth entry path 326 in the illustrated embodiment in addition to determining the threshold positions for the first entry path 306. Additionally, while the threshold positions for the first entry path 306 are determined based on the points of the intersection with the fourth path 316, it should be understood that threshold points may be determined based on the points of intersection of the paths corresponding to the entry path that occur the closest to the entry path, which may include points of intersection with more than one other path in some instances. Further, while the paths from each of the entry paths in the illustrated embodiment are shown for vehicles turning right, turning left, and proceeding straight from each of the entry paths, in other instances the paths may proceed in more or fewer direction. For example, the paths may include a U-turn path or additional turn paths in some instances, and/or may omit any of the turn right, turn left, or proceed straight paths in some instances.

Figure 4:
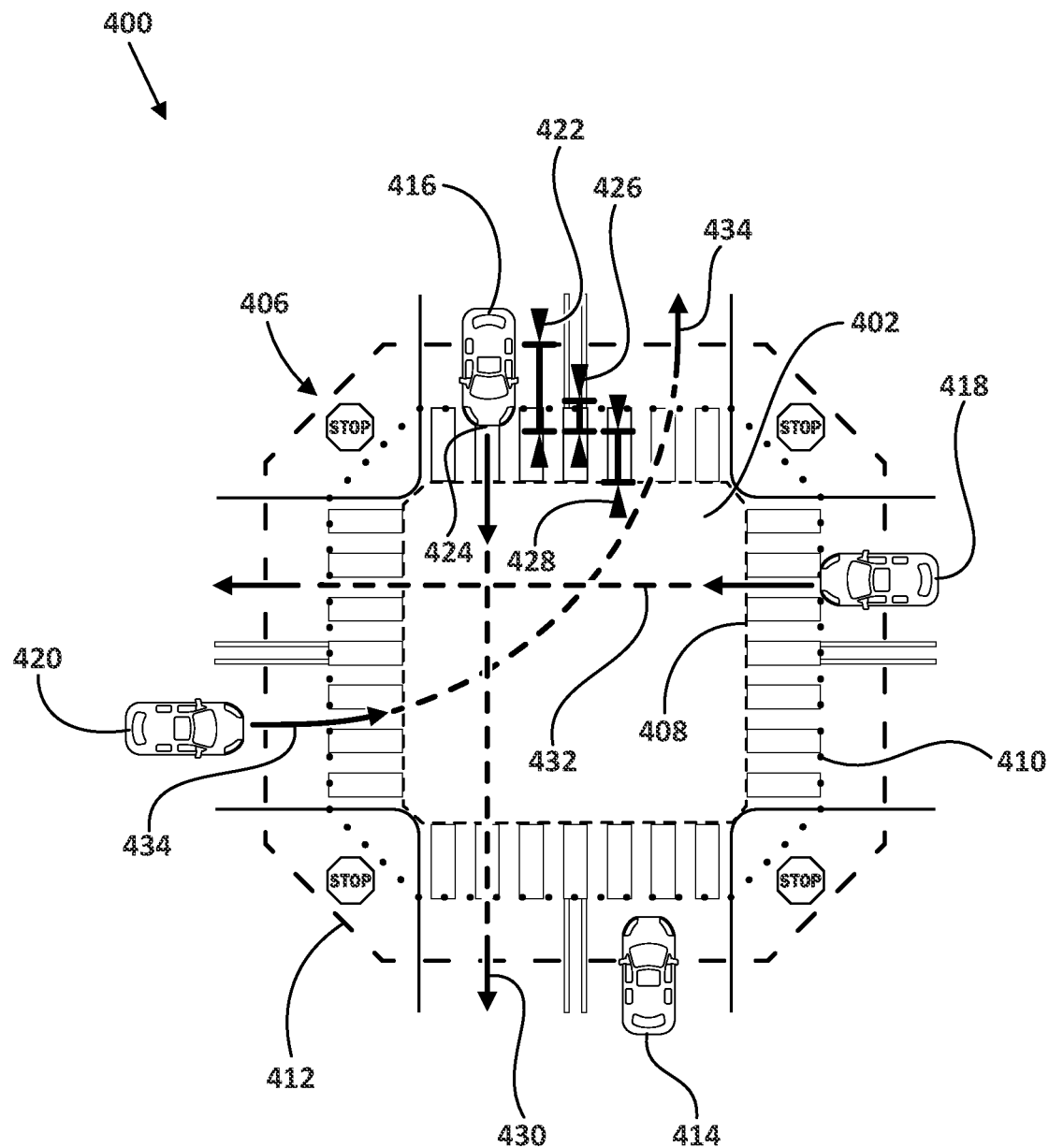
FIG. 4 illustrates another example an intersection arrangement, according to embodiments described herein.

FIG. 4 illustrates another example an intersection arrangement 400, according to embodiments described herein. The intersection arrangement 400 may include one or more of the features of the intersection arrangement 100 (FIG. 1). For example, the intersection arrangement 400 may include an intersection 402. The intersection 402 may include one or more of the features of the intersection 102 (FIG. 1).

The intersection arrangement 400 may include an interest zone 406. The interest zone 406 corresponds to the intersection 402. In particular, the interest zone 406 extends over the intersection 402 and includes the crosswalks of the intersection 402. The interest zone 406 includes an interior zone 408, an intersection zone 410, and a buffer zone 412. The intersection zone 410 may extend over the entirety of the intersection 402 including the crosswalks. The interior zone 408 may extend over the intersection 402 excluding the crosswalks. The buffer zone 412 may extend around the intersection zone 410 and extend a certain distance from the edge of the intersection zone 410. In some embodiments, the buffer zone 412 may extend outward at a distance of three meters from the edges of the intersection zone 410.

The intersection arrangement 400 further includes an autonomous vehicle 414. The autonomous vehicle 414 may include one or more of the features of the autonomous vehicle 132 (FIG. 1). The autonomous vehicle 414 may detect one or more objects related to the intersection 402. For example, the autonomous vehicle 414 may detect the stop signs of the intersection 402, crosswalks of the intersection 402, stop lines of the intersection 402, lane indicators of the intersection 402 (such as lane lines and/or direction indicators for one or more of the lanes of the intersection 402), or some combination thereof. Based on the objects detected by the autonomous vehicle 414, the autonomous vehicle 414 may define the locations of the interest zone 406, including the interior zone 408, the intersection zone 410, and the buffer zone 412. For example, the autonomous vehicle 414 may define the locations of the interior zone 408, the intersection zone 410, and the buffer zone 412 relative to the autonomous vehicle 414. In other embodiments, the locations of the interior zone 408, the intersection zone 410, and the buffer zone 412 may be defined based on information regarding the intersection 402 previously captured, may be defined by a user, or may be determined by a combination of one or more of the previously captured information, the user, and the objects captured by the autonomous vehicle 414.

The intersection arrangement 400 may further include one or more other vehicles. In particular, the intersection arrangement 400 includes a first vehicle 416, a second vehicle 418, and a third vehicle 420 in the illustrated embodiment. The autonomous vehicle 414 may detect locations of the other vehicles, and/or portions of the other vehicles. For example, the autonomous vehicle 414 can determine locations of a plurality of points along each of the vehicles and determine an area occupied by each of the vehicles. Based on the determined areas of each of the vehicles, the autonomous vehicle 414 can determine the sizes of each of the vehicles, the types of each of the vehicles, or some combination thereof. The autonomous vehicle 414 can further store indications of the locations of each of the vehicles and a time at which the capture of the locations occurred. For example, the autonomous vehicle 414 may store an indication of the location of a front edge of the vehicle for each vehicle with an associated time stamp indicating a time that the location was captured. Further, the autonomous vehicle 414 may limit the stored indications of the locations of the vehicles to vehicles within the interest zone 406. For example, the autonomous vehicle 414 may store indications of the location of the first vehicle 416 and the second vehicle 418 with the associated time stamps, while the location of the third vehicle 420 may be omitted from being stored by the autonomous vehicle 414 at the instant shown in the illustrated embodiment due to the third vehicle 420 being outside of the interest zone 406.

The autonomous vehicle 414 may perform captures of the locations of the other vehicles as the vehicles proceed along paths within the interest zone 406. For example, the autonomous vehicle 414 may perform captures of positions of the vehicles at set intervals, such as at a rate of 10 hertz. The autonomous vehicle 414 may capture locations of the vehicles as the first vehicle 416 proceeds along a first path 430, as the second vehicle 418 proceeds along a second path 432, and as the third vehicle 420 proceeds along a third path 434. In some embodiments, the autonomous vehicle 414 may perform the captures of the positions of the vehicles only when the autonomous vehicle 414 is located within the interest zone 406. In some instances, the autonomous vehicle 414 may provide the captures for each of the vehicles for generation of a path diagram, such as the path diagram 300 (FIG. 3). For example, the captures for each of the vehicles may be combined with other captures of vehicles proceeding to the intersection 402 to produce a path diagram for the intersection 402.

Based on the stored locations and time stamps of the vehicles, the autonomous vehicle 414 may determine relationships between the locations of vehicles and locations of stop lines of the intersection 402, an edge of the interest zone 406, an edge of the intersection zone 410, an edge of the interior zone 408, or some combination thereof. For example, the autonomous vehicle 414 may determine a distance 422 between a front end 424 of the first vehicle 416 and an edge of the interest zone 406, a distance 426 between the front end 424 of the first vehicle 416 and an edge of the intersection zone 410 (where the edge of the intersection zone 410 is located at outer edge of the crosswalks that acts as a stop line for the intersection 402 in the illustrated embodiment), a distance 428 between the front end 424 of the first vehicle 416 and the edge of the interior zone 408, or some combination thereof. For brevity, the relationships between the location of the first vehicle 416 are described, although it is to be understood that the autonomous vehicle 414 can determine the relationships between other vehicles within the interest zone 406 (such as the second vehicle 418) and the corresponding zones and/or lines. The distances determined may be signed distances or unsigned distances. For example, the distance 426 may be positive to indicate that the front end 424 of the first vehicle 416 is between the edge of the interest zone 406 and the edge of the intersection zone 410, and may be negative to indicate that the front end 424 of the first vehicle 416 is located on an opposite side of the edge of the intersection zone 410 from the edge of the interest zone 406. In other embodiments, the distances may be unsigned and which side of the edges and/or line the front end 424 of the first vehicle 416 may be located on may be determined based on two or more of the distances. For example, which side of the edge of the intersection zone 410 the front end 424 of the first vehicle 416 is on may be determined based on the distance 422 and the distance 426.

Further, the autonomous vehicle 414 may determine characteristics of the other vehicles within the interest zone 406. In particular, the autonomous vehicle 414 may utilize two or more stored captures of the positions of the vehicles and the corresponding time stamps to determine characteristics of other vehicles within the interest zone. The characteristics may include speed of each of the vehicles, acceleration of each of the vehicles, or some combination thereof. For example, the autonomous vehicle 414 may determine a speed of the first vehicle 416 at time based on at least two captures of the position of the autonomous vehicle 414 and the corresponding time stamps. In particular, the autonomous vehicle 414 may determine the distance that the first vehicle 416 travelled within a certain time period based on the at least two captures of the position and determine the speed of the vehicle based on the distance travelled within the time period. Further, the autonomous vehicle 414 may determine an acceleration of the first vehicle 416 based on at least three captures. In particular, the autonomous vehicle 414 may determine a first speed based on a first portion of the at least three captures and a second speed based on a second portion of the at least three captures, the second portion extending in time after the first portion, and determine an amount of acceleration based on the difference between the first speed and the second speed.

The autonomous vehicle 414 may further determine a right of way order of the vehicles within the interest zone 406. In particular, the right of way order may comprise an indication of an order the vehicles should proceed through the intersection 402 based on the rules of the road and/or the characteristics of the intersection 402. For the illustrated intersection arrangement 400 that have stop indicators in all directions, the autonomous vehicle 414 may determine the right of way order based on an order that the vehicles arrived at the intersection 402, an order that the vehicles entered the interest zone 406, an order in which the vehicles stopped at the corresponding stop line, whether there is a vehicle in the lane in front of the vehicle, or some combination thereof. For example, the autonomous vehicle 414 may assign the first vehicle 416 a first position in the order based on the first vehicle 416 arriving first at the intersection 402, assign itself a second position in the order based on the autonomous vehicle 414 arriving second at the intersection 402, assign the second vehicle 418 a third position in the order based on the second vehicle 418 arriving third at the intersection 402, and assign the third vehicle 420 a fourth position in the order when the third vehicle 420 arrives at the intersection 402. In other embodiments, the autonomous vehicle 414 may include only vehicles arriving at the intersection 402 after the autonomous vehicle 414 or only the vehicles arriving at the intersection 402 after the autonomous vehicle within a threshold time of the autonomous vehicle 414, where the threshold time may be one second. For example, the autonomous vehicle 414 may assign itself a first position in the order, assign the second vehicle 418 a second position in the order based on the second vehicle 418 arriving second at the intersection 402 after the autonomous vehicle 414, and assign the third vehicle 420 a third position in the order when the third vehicle 420 arrives at the intersection 402, while the first vehicle 416 is not included in the order due to the first vehicle 416 arriving at the intersection 402 prior to arrival of the autonomous vehicle 414 at the intersection 402.

When a vehicle leaves the interest zone 406, the vehicle may be removed from the right of way order and vehicles lower in the order may be promoted in the order. For example, when the vehicle assigned a first position in a right of way order leaves the interest zone 406, a vehicle assigned a second position in the right of way order may be promoted to the first position in the right of way order. In other embodiments, the vehicle may be removed from the right of way order and vehicles lower in the order may be promoted in the order when the vehicle arrives at a threshold position.

The autonomous vehicle 414 may further determine characteristics related to the right of way order from the captures of the locations of each of the vehicles and the corresponding time stamps. The characteristics related to the right of way order may include whether each of the vehicles has another vehicle in front of it (which may be referred to as a "lead vehicle"), a difference in a time that each of the vehicles arrives at the intersection 402 and the earliest time that one of the vehicles that has not arrived at a threshold position or left the interest zone 406 arrived at the intersection 402, a number of vehicles that arrived at the intersection prior to the vehicle for each of the vehicles, or some combination thereof. For determining whether a vehicle has a lead vehicle, the autonomous vehicle 414 may determine whether there is another vehicle located between the interior zone 408 and the vehicle based on the captured positions of the vehicle.

The autonomous vehicle 414 may provide the captures of positions of the vehicles and corresponding time stamps to an analysis system (such as the analysis system 704 (FIG. 7)). In some embodiments, the autonomous vehicle 414 may further provide one or more of the derived characteristics to the analysis system. For example, the autonomous vehicle 414 may provide the distance to the stop line, the distance to the edge of the interest zone 406, the distance to the edge of the intersection zone 410, the distance to the edge of the interior zone 408, the right of way order, an indication of the presence of a lead vehicle, and/or the difference in the time the vehicle arrived at the intersection 402 as compared to the earliest time that one of the vehicles that has not arrived at the threshold position or left the interest zone 406 arrived at the intersection 402 to the analysis system. In some embodiments, the autonomous vehicle 414 may not provide the derived characteristics to the analysis system and the analysis system may derive the characteristics from the captures of the positions of the vehicles and the corresponding time stamps provided to the analysis system.

Figure 5:
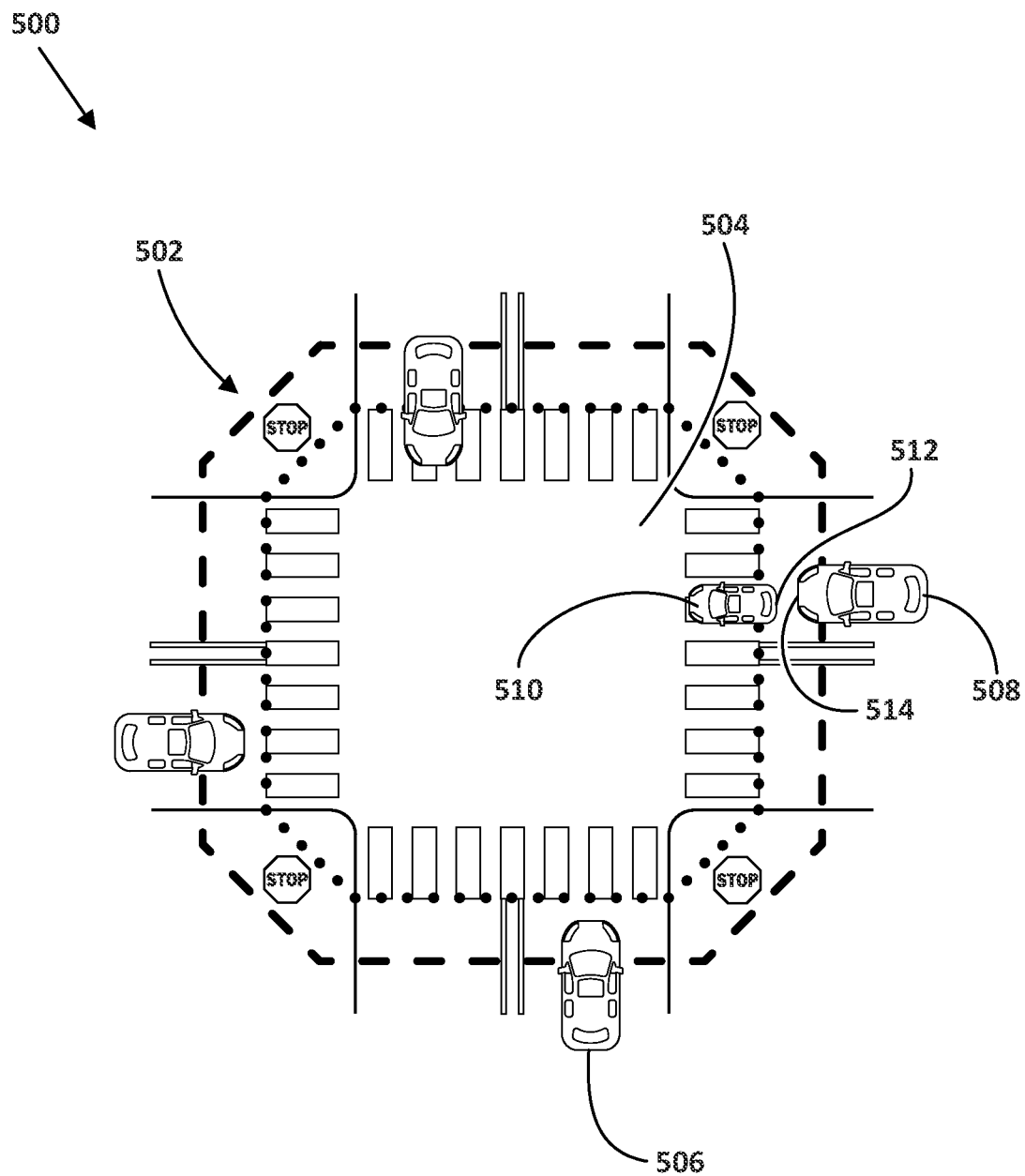
FIG. 5 illustrates another example of an intersection arrangement, according to embodiments described herein.

FIG. 5 illustrates another example of an intersection arrangement 500, according to embodiments described herein. The intersection arrangement 500 may include one or more of the features of the intersection arrangement 400 (FIG. 4). In particular, the intersection arrangement 500 may include an interest zone 502 corresponding to an intersection 504, where the interest zone 502 includes one or more features of the interest zone 406 (FIG. 4).

The intersection arrangement 500 may include an autonomous vehicle 506. The autonomous vehicle 506 may perform one or more of the operations performed by the autonomous vehicle 414 (FIG. 4). The intersection arrangement 500 may further include a first vehicle 508 and a second vehicle 510. The autonomous vehicle 506 may capture locations of the first vehicle 508 and the second vehicle 510 in the illustrated embodiment, and may determine that the second vehicle 510 is a lead vehicle for the first vehicle 508 in the illustrated embodiment. In particular, the autonomous vehicle 506 may determine that the second vehicle 510 has yet to arrive at any of the corresponding threshold positions (such as the first threshold position, the second threshold position, and the third threshold position described in relation to FIG. 3). Further, the autonomous vehicle 506 may determine that a back end 512 of the second vehicle 510 is within a certain distance of a front end 514 of the first vehicle 508. In some embodiments, the distance for determining that the second vehicle 510 is a lead vehicle for the first vehicle 508 may be three meters. In particular, the autonomous vehicle 506 may determine that the second vehicle 510 is a lead vehicle for the first vehicle 508 based on the second vehicle 510 not having arrived at any of the corresponding threshold positions and a back end 512 of the second vehicle 510 is within three meters of the front end 514 of the first vehicle 508 in the illustrated embodiment. In other embodiments, the autonomous vehicle 506 may provide the captures of the positions of the vehicles to an analysis system (such as the analysis system 704 (FIG. 7)) and the analysis system may determine that the second vehicle 510 is a lead device for the first vehicle 508 based on the received captures of the positions of the vehicles.

Figure 6:
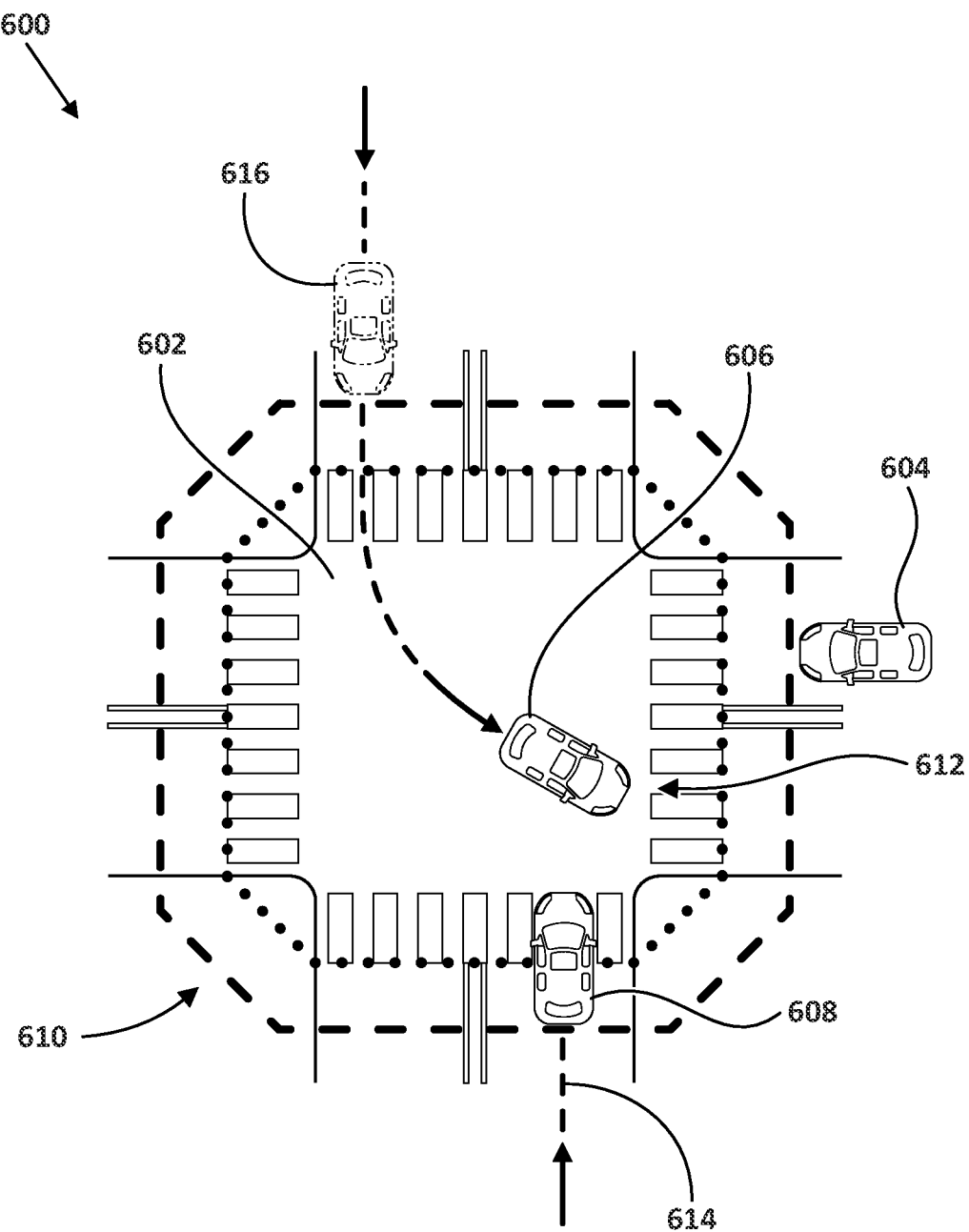
FIG. 6 illustrates another example intersection arrangement, according to embodiments described herein.

FIG. 6 illustrates another example intersection arrangement 600, according to embodiments described herein. The intersection arrangement 600 may include one or more of the features of the intersection arrangement 400 (FIG. 4) and/or the intersection arrangement 500 (FIG. 5). The intersection arrangement 600 may include an intersection 602 with an autonomous vehicle 604 approaching the intersection 602. The intersection arrangement 600 may further include a first vehicle 606 and a second vehicle 608.

The autonomous vehicle 604 may have determined, or the derived information based on captures performed by the autonomous vehicle 604 may indicate, that the second vehicle 608 has priority over the first vehicle 606 to proceed through the intersection 602 based on an order that the first vehicle 606 and the second vehicle 608 arrived at the intersection 402, entered the interest zone 610, stopped at the corresponding stop line, or some combination thereof. In particular, the second vehicle 608 may have been assigned a first position in a right of way order for the intersection 602 and the first vehicle 606 may have been assigned a second position in the right of way order for the intersection 602. However, captures of the movement of the vehicles captured by the autonomous vehicle 604 indicate that the first vehicle 606 arrived at a threshold position 612 prior to the second vehicle 608 proceeding through the intersection 602. In particular, at least one of the captures of the positions of the vehicles indicates that the first vehicle 606 was located at the threshold position 612 while the second vehicle 608 is still located toward an entry path 614 of the second vehicle 608. When a vehicle arrives at a threshold position prior to being assigned a first position within the right of way order, the vehicle may be referred to as an assertive vehicle. A vehicle that arrives at a threshold position after being assigned a first position within the right of way order may be referred to as a non-assertive vehicle. In some embodiments, the autonomous vehicle 604 may identify that the first vehicle 606 is an assertive vehicle based on the first vehicle arriving at threshold position 612 prior to the first vehicle 606 being assigned the first position in the right of way order. In other embodiments, the captures of the positions of the vehicles may be provided to an analysis system (such as the analysis system 704 (FIG. 7)) where the first vehicle 606 may be identified as an assertive vehicle.

Figure 7:
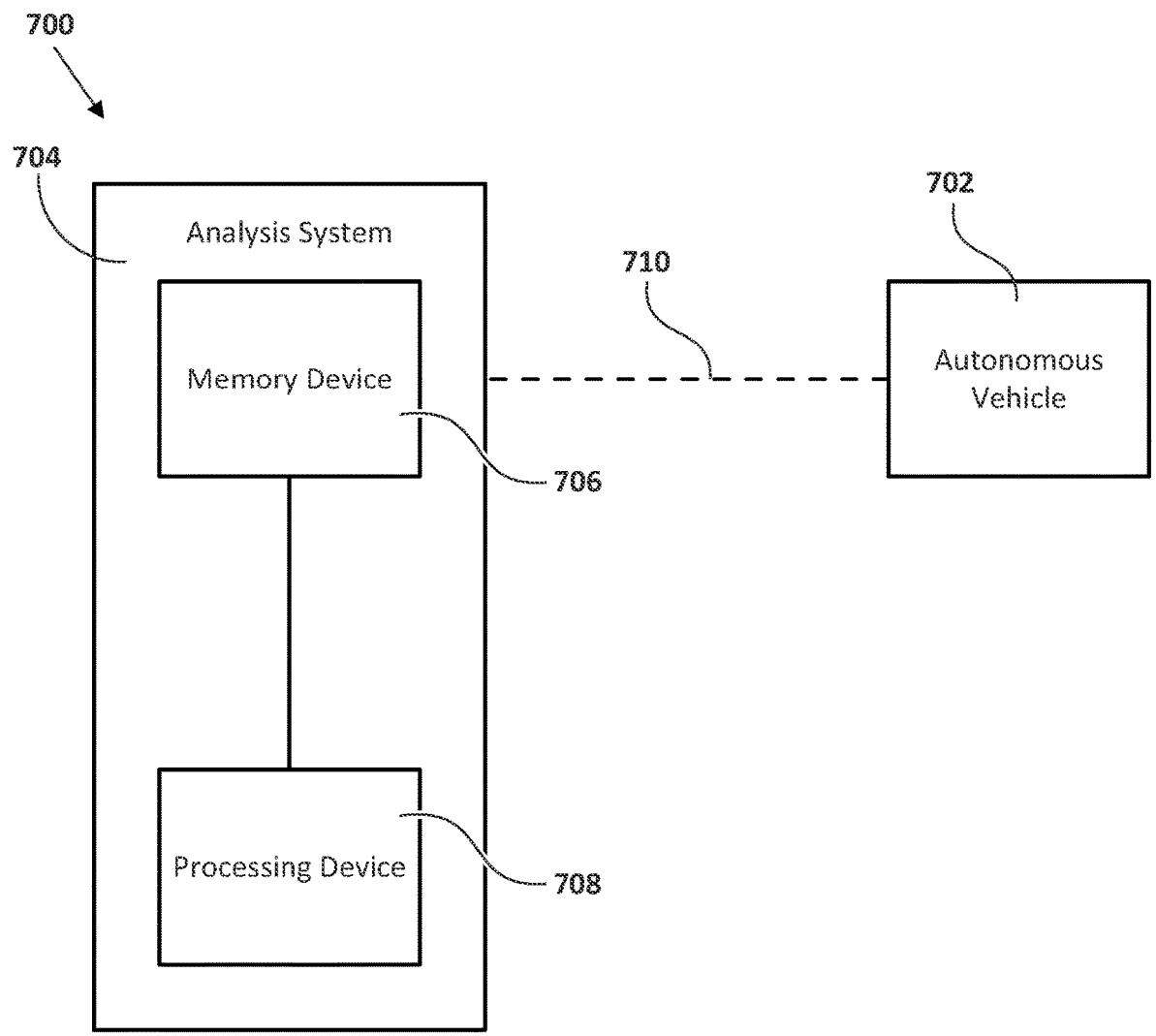
FIG. 7 illustrates an example model generation arrangement, according to embodiments described herein.

In response to being identified as an assertive vehicle, past captures of the movement of the vehicle within the interest zone 610 may be analyzed. For example, past captures may be stepped through from the capture that indicates that the first vehicle 606 arrived at the threshold position 612 to identify a past capture that indicates that the first vehicle 606 was travelling below a threshold speed, was greater than a threshold distance from the intersection 602, or some combination thereof. In the illustrated embodiment, it may be determined that the first vehicle 606 was in a second position 616 when the first vehicle was travelling below the threshold speed or was greater than a threshold distance from the intersection 602. The captures between the capture that indicates that the first vehicle 606 arrived at the threshold position 612 and the capture that indicates that the first vehicle 606 was travelling below the threshold speed, was greater than the threshold distance from the intersection 602, or some combination thereof, may be referred to as asserting captures. The asserting captures may be analyzed to determine characteristics that can be utilized for predicting whether a vehicle approaching an intersection will be an assertive vehicle (i.e., arrive at a threshold position prior to a time corresponding to its position in the right of way order). For example, the derived characteristics (including the distance to a stop line/edge of an intersection zone, a distance to an edge of an interior zone, a speed of the vehicle, an acceleration of the vehicle, whether the vehicle has a lead vehicle, a difference in the time the vehicle arrived at the intersection and the earliest time that one of the vehicles that had not arrived at a threshold position or left the interest zone arrived at the intersection, a right of way order of the vehicles, or some combination thereof) for each of the asserting captures may be analyzed to identify characteristics that can be utilized for predicting whether a vehicle approaching an intersection will be an assertive vehicle, FIG. 7 illustrates an example model generation arrangement 700, according to embodiments described herein. The model generation arrangement 700 illustrates components that may generate a model for identifying assertive vehicles by autonomous vehicles. In particular, the model generated may be implemented by autonomous vehicles for predicting whether a vehicle approaching an intersection with stop indicators will be an assertive vehicle.

The model generation arrangement 700 may include one or more autonomous vehicles 702. The autonomous vehicles 702 may include one or more of the features of the autonomous vehicle 132 (FIG. 1), the autonomous vehicle 414 (FIG. 4), the autonomous vehicle 506 (FIG. 5), and/or the autonomous vehicle 604 (FIG. 6). Further, the autonomous vehicles 702 may perform one or more of the operations of the autonomous vehicles described throughout this disclosure. For example, the autonomous vehicles 702 may capture positions of other vehicles at an intersection as the other vehicles proceed within an interest zone corresponding to the intersection. In some embodiments, the autonomous vehicles 702 may further derive characteristics related to the other vehicles, such as a distance to a corresponding stop line, a distance to a corresponding edge of an interest zone, a distance to a corresponding edge of an intersection zone, a distance to a corresponding edge of an interior zone, a right of way order, an indication of the presence of a lead vehicle, a difference in the time the vehicle arrived at an intersection as compared to the earliest time that one of the other vehicles that has not arrived at the threshold position or left the interest zone had arrived at the intersection to the analysis system, or some combination thereof. Further, the autonomous vehicles 702 may identify assertive vehicles and non-assertive vehicles in some embodiments, where the autonomous vehicles 702 may also identify and/or analyze the asserting captures in some of the embodiments.

The model generation arrangement 700 may further include an analysis system 704. The analysis system 704 may be coupled to the autonomous vehicles 702. For example, the analysis system 704 may be wirelessly coupled to the autonomous vehicles 702 via a wireless connection 710 and may communicate with the autonomous vehicles 702. The analysis system 704 may receive the captures of the positions of vehicles from the autonomous vehicles 702 and may store the captures as data within a memory device 706. In some embodiments, the analysis system 704 may further receive the derived characteristics related to the other vehicles, may receive the identification of the assertive vehicles and non-assertive vehicles, the identification of the asserting captures, the results of analyzing the asserting captures, or some combination thereof and store these as data within the memory device 706. The memory device 706 may comprise a computer-readable media. Further, the memory device 706 may further be non-transitory. The memory device 706 may further have one or more instructions stored thereon that, when executed, causes the analysis system 704 to perform one or more operations described herein.

While the memory device 706 is illustrated and described as being part of the analysis system 704, it should be understood that the memory device 706 may be located outside of the analysis system 704 and coupled to the analysis system 704 in other embodiments. For example, the memory device 706 may be located in a server in some embodiments, where the analysis system 704 may retrieve data from and store data on the server.

The analysis system 704 may further include a processing device 708 (such as a processor). The processing device 708 may generate the model for identifying an assertive vehicles when implemented by an autonomous vehicle based on the data received from the autonomous vehicles 702. For example, the processing device 708 may retrieve the data from the memory device 706 and analyze the data to produce the model that can used by autonomous vehicles to identify predicted assertive vehicles and predicted non-assertive vehicles during operation of the autonomous vehicles.

The processing device 708 may identify data received from the autonomous vehicles 702 related to a certain intersection having stop indicators in at least two directions. For example, the processing device 708 may identify data related to a certain intersection based on the positions where the vehicles were located when captured and/or a road map having the certain intersection. The processing device 708 may retrieve the data related to the certain intersection, where the data may include data related to multiple vehicles that proceeded through the certain intersection and/or were captured by multiple autonomous vehicles 702. The data retrieved may include data representing movement of vehicles within an interest zone corresponding to the intersection.

If the data, when received from the autonomous vehicles 702, does not include the derived characteristics or some portion thereof, the processing device 708 may analyze the captures represented by the data to produce the derived characteristics for the data. For example, the processing device 708 may produce a distance to a corresponding stop line, a distance to a corresponding edge of an interest zone, a distance to a corresponding edge of an intersection zone, a distance to a corresponding edge of an interior zone, a right of way order, an indication of the presence of a lead vehicle, a difference in the time the vehicle arrived at an intersection as compared to the earliest time that one of the other vehicles that has not arrived at the threshold position or left the interest zone arrived at the intersection to the analysis system, or some combination thereof, for each of the vehicles represented by the data. The processing device 708 may store the derived characteristics as part of the data in the memory device 706. If the data, when received from the autonomous vehicles 702 includes the derived characteristics or some portion thereof, the processing device 708 may utilize the derived characteristics received from the autonomous vehicles 702.

In some embodiments, the processing device 708 may filter the retrieved data to remove a portion of the data associated with irrelevant vehicles. In particular, the processing device 708 may filter out data related to vehicles that arrived at the intersection prior to the autonomous vehicle that captured the positions of the vehicles or that arrived at the intersection within a threshold time of the arrival of the autonomous vehicle. Further, the processing device 708 may filter data related to vehicles where greater than a threshold of a number of captures for the vehicles is missing from the data, where the threshold of the number of captures may correspond to a threshold time, such as three seconds. The processing device 708 may also filter data where a perception error occurred, such as where a size of the vehicle related to the data could not be properly determined or where the determined size of the vehicle related to the data varied among the captures of the vehicle. In embodiments where the filtering is performed, the filtered data may be utilized for the further processing of the data. In other embodiments, the unfiltered data may be utilized for the further processing.

The processing device 708 may determine which of the vehicles corresponding to the retrieved data are assertive vehicles and which of the vehicles corresponding to the retrieved data are non-assertive vehicles based on the data and/or the derived data. In embodiments where the data received from the autonomous vehicles 702 indicates which vehicles are assertive vehicles and which vehicles are non-assertive vehicles, the processing device 708 may utilize the indications to determine which of the vehicles are assertive vehicles and which vehicles are non-assertive vehicles. In other embodiments, the data may be presented to a user (such as being presented as a diagram to the user) and the user may indicate which vehicles are assertive vehicles and which vehicles are non-assertive vehicles. The processing device 708 may utilize the indications provided by the user to determine which vehicles are assertive vehicles and which vehicles are non-assertive vehicles. In other embodiments, the processing device 708 may determine a right of way order value for each of the vehicles, where the right of way order value indicates a position of the vehicle in the right of order. The processing device 708 may further determine when each of the vehicles crossed a corresponding threshold position. The processing device 708 may determine when the vehicles crossed the corresponding threshold position based on a distance to an interior zone corresponding to the intersection. The processing device 708 may determine whether when each of the vehicles crossed the corresponding threshold position corresponds with the right of way order related to the vehicle. In particular, the processing device 708 may determine whether a vehicle crossed the corresponding threshold position at a time prior to a time that corresponds to a right of way value for the vehicle. For example, the processing device 708 may determine that the vehicle crossed the corresponding threshold position prior to the time that corresponds to right of way value for the vehicle if the vehicle was not assigned a first position in the right of way order at the time that the vehicle crossed the corresponding threshold position. The processing device 708 may identify the vehicles that crossed prior to the time as assertive vehicles and the vehicles that crossed at or after the time as non-assertive vehicles.

The processing device 708 may identify a first portion of the data associated with the identified assertive vehicles and a second portion of the data associated with the identified non-assertive vehicles. In particular, the processing device 708 may identify, for each of the identified assertive vehicles, data related to the captures of the positions of the vehicles as the first portion of the data. Further, the processing device 708 may identify, for each of the identified non-assertive vehicles, data related to the captures of the positions of the vehicles as the second portion of the data.

The processing device 708 may generate one or more models for identifying the assertive vehicles based on the first portion of the data related to the assertive vehicles and the second portion of the data related to the non-assertive vehicles. The one or more models may comprise a logistic regression model, a support vector machine model, a decision tree model, a random forest model, a feedforward neural network model, or a combination thereof. In some embodiments, the models may utilize a current position, a distance to a stop line, a distance to an edge of an intersection, a distance to an edge of an interior zone, a speed, an acceleration, an indication of a corresponding lead vehicle, an indication of a right of way order, or some combination thereof, to predict whether a vehicle will be an assertive vehicle. Each of the models may produce results that are consistent with the processing device 708. in identifying the identified assertive vehicles and the identified non-assertive vehicles.

In embodiments where a plurality of models are generated by the processing device 708, the processing device 708 may test each of the models, assign a performance score to each of the models, and select one of the models to be implemented in the autonomous vehicles based on the performance score to identify vehicles that are predicted to be an assertive vehicle. For example, the processing device 708 may test each of the models and produce precision-recall metrics based on the testing, where the precision-recall metrics may comprise the performance score. FIG. 8 illustrates example precision-recall metrics that may be produced based on the testing of the generated models, according to embodiments described herein. The testing may include analyzing a plurality of scenarios of vehicle movement within a second interest zone corresponding to a second intersection having stop indicators in at least two directions. In some embodiments, the second interest zone and the second intersection may be the same interest zone and the same intersection utilized for generating the models. The testing may generate and assign the precision scores based on whether the assertive vehicles and the non-assertive vehicles are correctly identified within the plurality of scenarios. One of the models may be selected to be implemented in the autonomous vehicles based on the precision-recall metrics. In some embodiments, the model with the highest precision score and recall score may be selected. In some embodiments, the precision score and the recall score may be weighted, a combined score may be generated based on the weighted precision score and the weighted recall score, and the model that produces the highest combined score may be selected for implementation in the automated vehicles. In other embodiments, the performance score may be presented to a user and a user may select the model to be implemented in the autonomous vehicles.

In some embodiments, a true positive/false positive analysis may be performed with one or more of the models. The true positive/false positive analysis may include comparing predictions with observed behavior of vehicles based on each of the models. In particular, for a certain vehicle at the intersection, a prediction of the assertive vehicle produced by the model is compared with the actual observed behavior of the certain vehicle. The comparison may be performed for multiple situations, where the situation may be grouped into multiple different groups based on similarities between the situations. Mismatch scores may be produced based on the true positive/false positive analysis, where the mismatch scores indicate an amount of times that the prediction of the assertive vehicle did not match the observed behavior. In some embodiments, one or more of the groups with highest mismatch scores may be identified and presented to a user for analysis. Further, the situations in the one or more groups with the highest mismatch scores may be boosted (such as by upsampling the situations within the groups) and utilized to retrain the one or more models to improve the performance of the models.

The analysis system 704 may further provide the model or the selected model for implementation in the autonomous vehicles 702. In particular, the analysis system 704 may provide the model to be implemented to each of the autonomous vehicles 702 via the wireless connection 710. the autonomous vehicles 702 may implement the provided model for identifying assertive vehicles.

Figure 9:
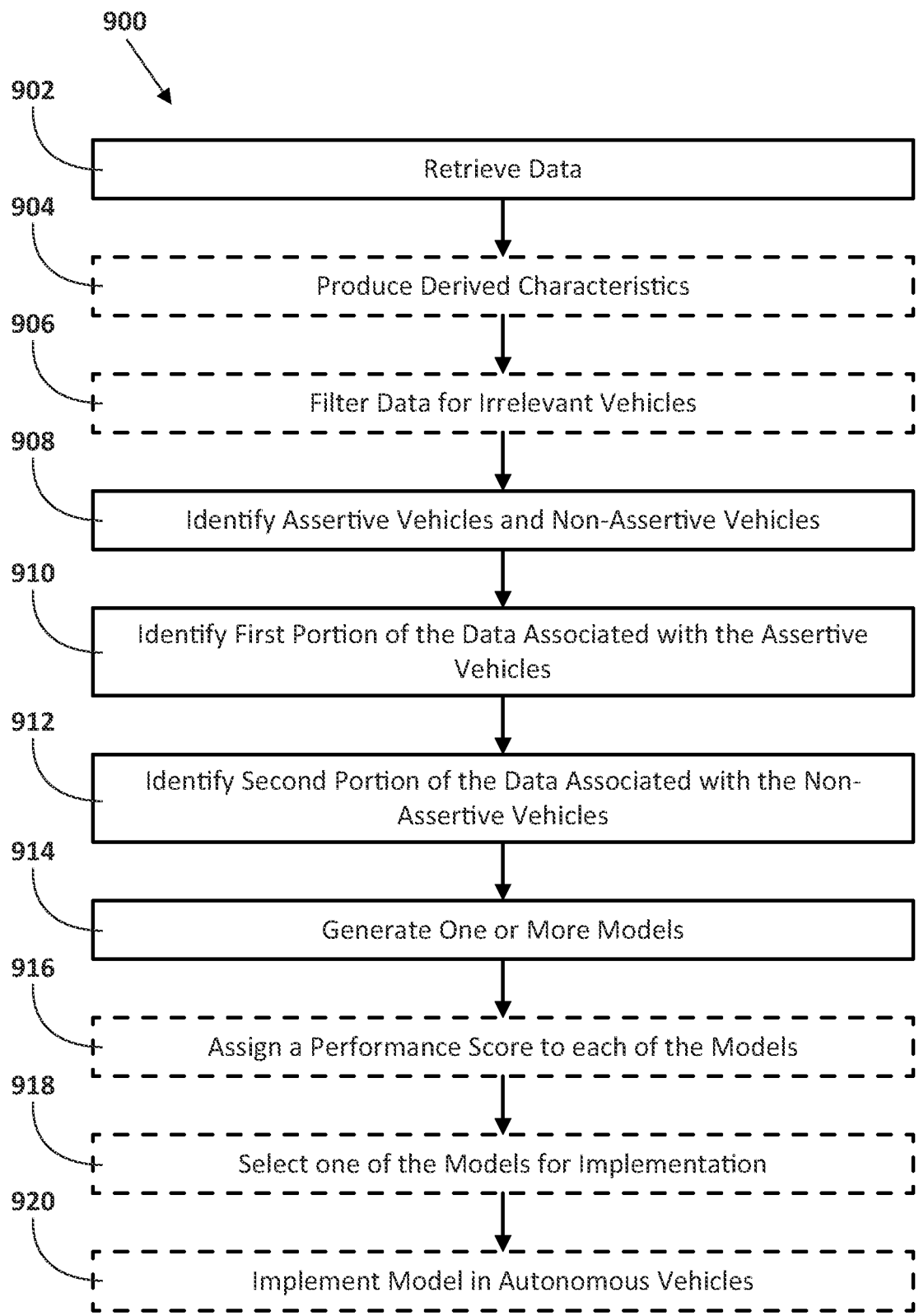
FIG. 9 illustrates an example procedure that may be performed by an analysis system, according to embodiments described herein.

FIG. 9 illustrates an example procedure 900 that may be performed by an analysis system, according to embodiments described herein. For example, the procedure 900 may be performed by the analysis system 704 (FIG. 7).

In stage 902, the analysis system may retrieve data representing movement of vehicles within an interest zone from a memory device. The interest zone may correspond to an intersection having stop indicators in at least two directions. The data retrieved may include captures and corresponding time stamps of the movement of vehicles through the intersection captured by one or more autonomous vehicles. Further, the data may include one or more derived characteristics based on the captures and/or indications of whether the vehicles related to the data were identified as an assertive vehicle or a non-assertive vehicle in some embodiments.

In stage 904, the analysis system may produce one or more derived characteristics based on the captures and corresponding time stamps in some embodiments. In particular, if the data retrieved does not include the derived characteristics or includes a portion of the derived characteristics, the analysis system may produce the derived characteristics not included in the retrieved data. The produced derived characteristics may be saved as part of the data. In some embodiments, stage 904 may be omitted.

In stage 906, the analysis system may filter a portion of the data related to irrelevant vehicles in some embodiments. In particular, the analysis system may filter the data related to vehicles that arrived prior to or within a threshold time of the arrival of the autonomous vehicle that generated the captures at the intersection. Further, the data related to vehicles where a threshold amount of the captures are missing and/or there are perception errors (such as a size of a vehicle not being properly identified and/or the size of the vehicle varying between the captures) may be filtered in some embodiments. In some embodiments, stage 906 may be omitted.

In stage 908, the analysis system may identify assertive vehicles and non-assertive vehicles from the data. In particular, the analysis may analyze the captures and/or the derived characteristics for each of the vehicles to determine whether the vehicle is an assertive vehicle or a non-assertive vehicle. The analysis system may identify the assertive vehicles and the non-assertive vehicles based on indications received from the autonomous vehicles in the data, indications received from a user, a time that each of the vehicles crossed a corresponding threshold position and a right of way order related to the vehicle, or some combination thereof.

In stage 910, the analysis system may identify a first portion of the data associated with the identified assertive vehicles. In particular, the analysis system may identify a portion of the data that corresponds to the captures associated with the identified assertive vehicles as the first portion of the data.

In stage 912, the analysis system may identify a second portion of the data associated with the identified non-assertive vehicles. In particular, the analysis system may identify a portion of the data that corresponds to the captures associated with the identified non-assertive vehicles as the second portion of the data.

In stage 914, the analysis system may generate one or more models for identifying an assertive vehicle by an autonomous vehicle. The models may produce results that are consistent with the analysis system in identifying the one or more identified assertive vehicles and the one or more identified non-assertive vehicles. For example, the models may produce a same identification, or below a certain amount of error in identification, of the assertive vehicles and the non-assertive vehicles when the data related to the vehicles is utilized in the models.

In stage 916, the analysis system may assign a performance score to each of the models in some embodiments. For example, the analysis system may perform testing of each of the models and produce precision-recall metrics for each of the models, where the precision-recall metrics may comprise a performance score for the model. In some embodiments, stage 916 may be omitted, such as when the analysis system generates a single model in stage 914.

In stage 918, the analysis system may select one of the models for implementation in the autonomous vehicles. The model may be selected based on the performance score generated in stage 916. In some embodiments, stage 918 may be omitted.

In stage 920, the analysis system may implement the model in one or more autonomous vehicles. In particular, the analysis system may provide the model to the autonomous vehicles and the autonomous vehicles may utilize the model to predict whether vehicles at an intersection with stop indicators will be an assertive vehicle.

While a certain order is described for the procedure 900, it is to be understood that the order may differ in other embodiments. Further, one or more of the stages of the procedure 900 may be performed concurrently in some embodiments. In some embodiments, additional stages may be performed with the procedure 900 and/or one or more of the stages of the procedure 900 may be omitted.

Figure 10:
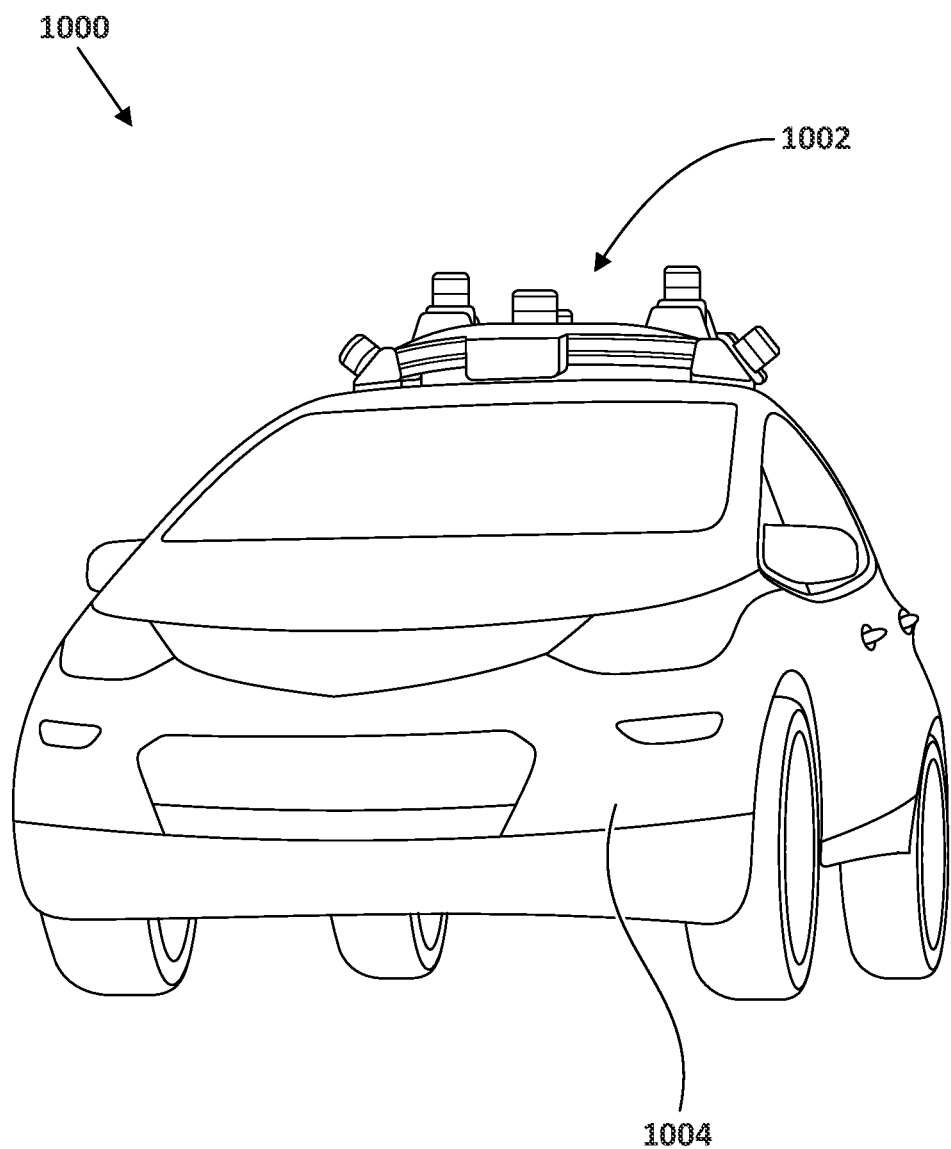
FIG. 10 illustrates an example autonomous vehicle, according to embodiments described herein.

FIG. 10 illustrates an example autonomous vehicle 1000, according to embodiments described herein. The autonomous vehicle 1000 is an example of an autonomous vehicle as described throughout this disclosure. The autonomous vehicle 1000 may capture positions of vehicles within an interest zone as described throughout this disclosure and provide the captures to a server and/or an analysis system (such as the analysis system 704 (FIG. 7)). Further, the models generated herein may be implemented in the autonomous vehicle 1000 for identifying assertive vehicles.

The autonomous vehicle 1000 may comprise a car 1004. The autonomous vehicle 1000 may include one or more sensors 1002 mounted to the car 1004. The sensors 1002 may be mounted to various locations on the car 1004. For example, the sensors 1002 may be mounted to a roof of the car 1004, side mirrors of the car 1004, a front of the car 1004, a back of the car 1004, sides of the car 1004, or some combination thereof.

The sensors 1002 may include one or more cameras, one or more light detection and ranging (LIDAR) sensors, one or more radar sensors, or some combination thereof. In some embodiments, the radar sensors may include articulating radar sensors, long-range radar sensors, short-range radar sensors, or some combination thereof. The sensors 1002 may detect the surroundings of the autonomous vehicle 1000. For example, the sensors 1002 may detect one or more objects surrounding the autonomous vehicle 1000, such as other cars, pedestrians, trees, bicycles, objects within a road on which the autonomous vehicle 1000 is travelling (such as construction and/or other objects that may impede movement of the vehicle), and/or indications surrounding the autonomous vehicle 1000 (such as construction signs, stop indicators, and other street signs).

The autonomous vehicle 1000 may further include a computer coupled to the sensors 1002. The computer may receive data captured by the sensors 1002 and utilize the data for localization, perception, prediction, route planning, maneuver planning, motion planning, path following, and low level controls of the autonomous vehicle 1000. Further, the computer may be communicatively coupled to a server and/or an analysis system (such as the analysis system 704 (FIG. 7)) and may exchange communications with the server and/or the analysis system. The computer may further be coupled to one or more of the systems of the autonomous vehicle 1000 and may control operation of throttle, braking, steering, and/or indicators of the autonomous vehicle 1000.

Figure 11:
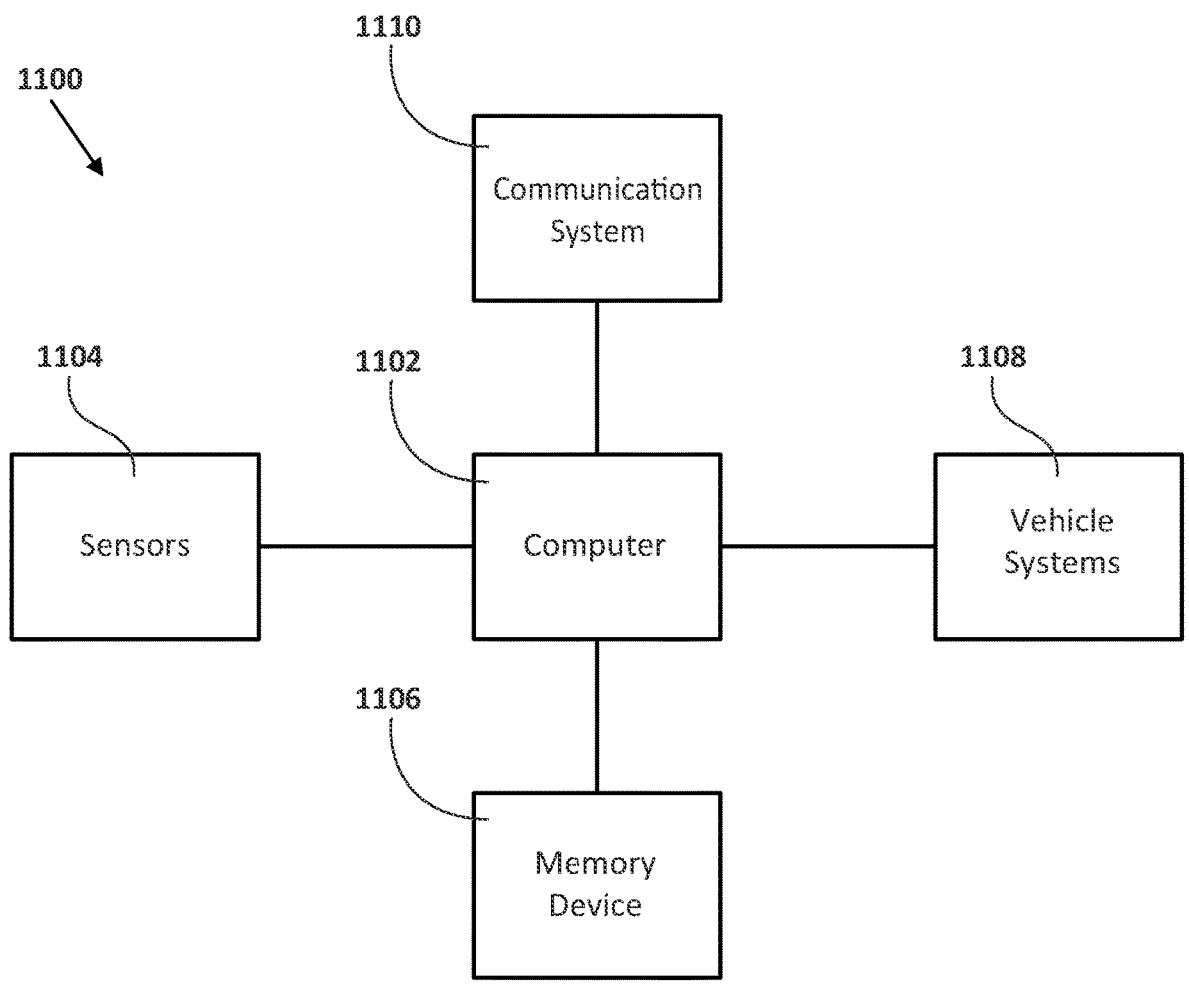
FIG. 11 illustrates example components that can be implemented within an autonomous vehicle, according to embodiments described herein.

FIG. 11 illustrates example components 1100 that can be implemented within an autonomous vehicle, according to embodiments described herein. In particular, the components 1100 may be implemented in the autonomous vehicles described throughout, such as the autonomous vehicle 1000 (FIG. 10).

The components 1100 may include a computer 1102. The computer 1102 may include one or more of the features of the computer described in relation to FIG. 10. The computer 1102 may coordinate one or more operations of the autonomous vehicle and may analyze data captured by the autonomous vehicle.

The components 1100 may further include one or more sensors 1104. The sensors 1104 may include one or more of the features of the sensors 1002. The sensors 1104 may be coupled to the computer 1102 and may provide data captured by the sensors 1104 to the computer 1102.

The components 1100 may further include one or more memory devices 1106. The memory device 1106 may be coupled to the computer 1102. In some embodiments, the memory device 1106 may also be coupled to the sensors 1104. The memory devices 1106 may be comprise computer-readable media. In some embodiments, the computer-readable media may be non-transitory computer-readable media. The memory devices 1106 may store one or more instructions that, when executed by the computer 1102, cause the computer 1102 to perform one or more operations described throughout this disclosure being performed by a computer implemented in an autonomous vehicle. Further, the memory devices 1106 may be utilized for storing data of the autonomous vehicle. For example, the computer 1102 may provide the data received from the sensors 1104 to the memory devices 1106 for storage on the memory devices 1106. Further, the memory device 1106 may store routes associated with route planning of the autonomous vehicle, maneuvers associated with maneuver planning of the autonomous vehicle, or some combination thereof.

The components 1100 may further include one or more vehicle systems 1108. The vehicle systems 1108 may be coupled to the computer 1102 and the computer 1102 may control operation of the vehicle systems 1108. The vehicles systems 1108 may include motion systems of the autonomous vehicle, indicator systems of the autonomous vehicle, or some combination thereof. The motion systems may include a throttle system, a braking system, a steering system, or some combination thereof, of the autonomous vehicle.

The components 1100 may further include a communication system 1110. The communication system 1110 may be coupled to the computer 1102. The communication system 1110 may comprise a wireless communication system and may allow the computer 1102 to wirelessly communicate with other devices, such as servers and/or analysis systems (such as the analysis system 704 (FIG. 7)). The communication system 1110 may implement one or more wireless communication standards, such as cellular communication standards, radar communication standards, satellite communication standards, global position system communication standards, Wi-Fi communication standards, and/or Bluetooth communication standards.

SELECT EXAMPLES

Below are provided some examples of embodiments in accordance with the subject matter provided in this disclosure. It should be understood that the examples are merely some examples and embodiments in accordance with the subject matter are not limited to the provided examples.

Example 1 may include a method for generating a model for identifying an assertive vehicle by an autonomous vehicle, comprising retrieving data representing movement of vehicles within an interest zone, wherein the interest zone corresponds to an intersection having stop indicators in at least two directions, identifying a first portion of the data associated with one or more identified assertive vehicles and a second portion of the data associated with one or more identified non-assertive vehicles, and generating the model for identifying the assertive vehicle based on the first portion of the data and the second portion of the data, wherein the model produces results that are consistent in identifying the one or more identified assertive vehicles and the one or more identified non-assertive vehicles from the data.

Example 2 may include the method of example 1, wherein the data includes a distance to a corresponding stop line, a distance to an interior zone corresponding to the intersection, a speed, an acceleration, an indication of a corresponding lead vehicle, an indication of a corresponding right of way order, or a difference in arrival time from a corresponding vehicle having a right of way for each of the vehicles.

Example 3 may include the method of example 1, further comprising identifying the one or more identified assertive vehicles and the one or more identified non-assertive vehicles based on a distance to an interior zone corresponding to the intersection and a right of way order corresponding to the vehicles for each of the vehicles.

Example 4 may include the method of example 3, further comprising identifying, based on the data, a portion of the vehicles that entered the interest zone prior to or within a threshold time of corresponding autonomous vehicles that captured the data, and filtering the data representing the movement of the vehicles to remove a portion of the data associated with the portion of the vehicles, wherein the filtered data is utilized for identifying the one or more identified assertive vehicles and the one or more identified non-assertive vehicles.

Example 5 may include the method of example 3, wherein identifying the one or more identified assertive vehicles and the one or more identified non-assertive vehicles includes determining right of way values for each of the vehicles, determining when each of the vehicles crossed a corresponding threshold position, identifying the one or more identified assertive vehicles from the vehicles based on the one or more identified assertive vehicles crossing the corresponding threshold position prior to times corresponding to the right of way values for each of the one or more identified assertive vehicles, and identifying the one or more identified non-assertive vehicles from the vehicles based on the one or more identified non-assertive vehicles crossing the corresponding threshold position at time corresponding to the right of way values for each of the one or more identified non-assertive vehicles.

Example 6 may include the method of example 5, wherein the threshold position for each of the vehicles comprises a position where a path of a vehicle of the vehicles crosses with a path of another vehicle of the vehicles.

Example 7 may include the method of example 1, wherein the model for identifying the assertive vehicle is a first model, wherein the interest zone is a first interest zone, wherein the intersection is a first intersection, and wherein the method further comprises generating a plurality of models for identifying the assertive vehicle based on the first portion of the data and the second portion of the data, wherein the plurality of models produce results that are consistent in identifying the one or more identified assertive vehicles and the one or more identified non-assertive vehicles from the data, and wherein the plurality of models include the first model, analyzing a plurality of scenarios of vehicle movement within a second interest zone using each of the plurality of models, wherein the second interest zone includes a second intersection having stop indicators in at least two directions, and wherein each of the plurality of models attempt to identify assertive vehicles and non-assertive vehicles within the plurality of scenarios, assigning each of the plurality of models a performance score based on whether each of the plurality of models correctly identifies the assertive vehicles and the non-assertive vehicles within the plurality of scenarios, and selecting, from the plurality of models, the first model for implementation in the autonomous vehicle based on the performance score corresponding to the first model indicating that the first model outperformed other models of the plurality of models.

Example 8 may include the method of example 7, further comprising causing the first model for identifying the assertive vehicle to be implemented by the autonomous vehicle.

Example 9 may include the method of example 1, wherein the interest zone includes an intersection zone and a buffer zone, wherein the intersection zone extends among stop locations of the intersection and covers the intersection, and wherein the buffer zone extends outward from the intersection zone by a distance.

Example 10 may include one or more computer-readable media having instructions stored thereon, wherein the instructions, in response to execution by a device, cause the device to retrieve data representing movement of vehicles within an interest zone, wherein the interest zone corresponds to an intersection having stop indicators in at least two directions, determine when each of the vehicles crossed a corresponding threshold position based on the data, determine a right of way order of the vehicles based on the data, determine whether when each of the vehicles crossed the corresponding threshold position corresponds to the right of way order of the vehicles, and label each of the vehicles as either an assertive vehicle or a non-assertive vehicle, wherein the assertive vehicle does not correspond to the right of way order and the non-assertive vehicle corresponds to the right of way order.

Example 11 may include the one or more computer-readable media of example 10, where to label each of the vehicles as either an assertive vehicle or a non-assertive vehicle includes to determine, for each of the vehicles that are labeled as an assertive vehicle, a first time when each of the vehicles had a vehicle speed below a threshold speed or a distance to an intersection zone of the interest zone was greater than a threshold distance, wherein the first time is prior to a second time when each of the vehicles is determined to have crossed the corresponding threshold position, and label a time interval from the first time to the second time as an asserting time interval for each of the vehicles.

Example 12 may include the one or more computer-readable media of example 10, wherein the instructions further cause the device to identify a portion of the data associated with irrelevant vehicles, and filter the portion of the data from the data to produce filtered data, wherein when each of the vehicles crossed the corresponding threshold position and the right of way order of the vehicles are determined based on the filtered data.

Example 13 may include the one or more computer-readable media of example 12, wherein the irrelevant vehicles include a portion of the vehicles that arrived prior to a threshold time and a portion of the vehicles that a size was not determined for a threshold duration.

Example 14 may include the one or more computer-readable media of example 10, wherein the instructions further cause the device to generate a model for identifying assertive vehicles based on the data, the model to be implemented by an autonomous vehicle, wherein the model produces results that are consistent with the labeling of each of the vehicles as the assertive vehicle or the non-assertive vehicle.

Example 15 may include the one or more computer-readable media of example 14, wherein the model is a first model, wherein the interest zone is a first interest zone, wherein the intersection comprises a first intersection, and wherein the instructions further cause the device to generate a plurality of models for identifying assertive vehicles based on the data, wherein the plurality of models includes the first model, and wherein each of model of the plurality of modes produces results that are consistent with the labeling of each of the vehicles as the assertive vehicle or the non-assertive vehicle, analyze a plurality of scenarios of vehicle movement within a second interest zone using each of the plurality of models, wherein each of the plurality of models attempt to identify assertive vehicles and non-assertive vehicles within the plurality of scenarios, assign a performance score to each of the plurality of models based on whether each of the plurality of models correctly identifies the assertive vehicles and the non-assertive vehicles within the plurality of scenarios, and select the first model for implementation in the autonomous vehicle based on the performance score corresponding to the first model indicating that the first model outperformed other models of the plurality of models.

Example 16 may include the one or more computer-readable media of example 15, wherein the plurality of models includes at least two models selected from a logistic regression model, a support vector machine model, a decision tree model, a random forest model, and a feedforward neural network model.

Example 17 may include the one or more computer-readable media of example 10, wherein the data includes indications of paths corresponding to each of the vehicles.

Example 18 may include a system for generating a model for identifying an assertive vehicle by an autonomous vehicle, comprising a memory device to store data representing movement of vehicles within an interest zone, wherein the interest zone corresponds to an intersection having stop indicators in at least two directions, a processing device coupled to the memory device, the processing device to identify one or more assertive vehicles of the vehicles based on the data, identify one or more non-assertive vehicles of the vehicles based on the data, and generate a model for identifying the assertive vehicle based on a first portion of the data associated with the one or more assertive vehicles and a second portion of the data associated with the one or more non-assertive vehicles, wherein the model produces results that are consistent in identifying the one or more assertive vehicles and the one or more non-assertive vehicles from the data.

Example 19 may include the system of example 18, wherein the model is a first model, wherein the interest zone is a first interest zone, wherein the intersection is a first intersection, and wherein the processing device is further to generate a plurality of models for identifying the assertive vehicle based on the first portion of the data and the second portion of the data, wherein the plurality of models includes the first model, and wherein each of the plurality of models produces results that are consistent in identifying the one or more assertive vehicles and the one or more non-assertive vehicles from the data, analyzing a plurality of scenarios of vehicle movement within a second interest zone using each of the plurality of models, wherein the second interest zone includes a second intersection having stop indicators in at least two directions, and wherein each of the plurality of models attempt to identify assertive vehicles and non-assertive vehicles within the plurality of scenarios, assigning each of the plurality of models a performance score based on whether each of the plurality of models correctly identifies the assertive vehicles and the non-assertive vehicles within the plurality of scenarios, and selecting, from the plurality of models, the first model for implementation in the autonomous vehicle based on the performance score corresponding to the first model indicating that the first model outperformed other models of the plurality of models.

Example 20 may include the system of example 18, wherein to identify the one more assertive vehicles includes to determine a right of way value corresponding to each of the vehicles, determine when each of the vehicles crossed a corresponding threshold position, and determine for each of the vehicles that a time when a subject vehicle crossed the corresponding threshold position does not correspond with the right of way corresponding to the subject vehicle.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In some embodiments, one or more of the components described throughout this disclosure may be implemented as one or more electrical circuits. The electrical circuits may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

Note that with the numerous examples provided herein, interaction may be described in terms of two, three, four, or more electrical components. However, this has been done for purposes of clarity and example only. It should be appreciated that the system can be consolidated in any suitable manner. Any of the disclosed components, modules, and element may be combined in various possible configurations in various embodiments, all of which are within the scope of this disclosure.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous changes, substitutions, variations, alterations, and modifications may be ascertained by one skilled in the art and it is to be understood that the present disclosure encompass all such changes, substitutions, variations, alterations, and modifications that may be ascertained by one skilled in the art. Further, it is to be understood that any protection that may be granted based on this disclosure are not to be limited by the description. Rather, the protection is to be defined by the appended claims when read in view of the description and as would be understood by one skilled in the art.

The invention claimed is:

1. A computer-implemented method, comprising:
   capturing, by one or more autonomous vehicles, data representing surroundings of the one or more autonomous vehicles, including physical characteristics of an intersection and movement characteristics of vehicles within an interest zone, wherein the interest zone corresponds to the intersection having stop indicators in at least two directions;
   identifying, by a processing device of an analysis system, a first portion of the data associated with one or more identified assertive vehicles and a second portion of the data associated with one or more identified non-assertive vehicles, wherein identifying the first portion of the data associated with one or more identified assertive vehicles comprises
- identifying threshold positions of the intersection corresponding to positions where entry paths of the intersection crosses each other;
- identifying an order in which a plurality of identified vehicles is expected to cross the threshold position;
- identifying a first vehicle in the plurality of identified vehicles as an assertive vehicle responsive to the captured data indicating the first vehicle arrives at the threshold position prior to at least one other vehicle in the plurality of identified vehicles, where the at least one other vehicle has an earlier position in the order than the first vehicle;
- generating a model to discriminate between assertive vehicles and non-assertive vehicles using the first portion of the data and the second portion of the data, wherein the model utilizes characteristics of a particular vehicle in the interest zone to predict when a vehicle is likely to be an assertive vehicle or a non-assertive vehicle, and the model produces results that are consistent with the analysis system in identifying the one or more identified assertive vehicles and the one or more identified non-assertive vehicles;
- implementing the model on an autonomous vehicle to discriminate between assertive and non-assertive vehicles; and
- taking an action, by the autonomous vehicle, based on results of the implemented model.

2. The computer-implemented method of claim 1, wherein the characteristics of the particular vehicle includes velocity, acceleration, and position.

3. The computer-implemented method of claim 1, wherein the interest zone comprises a buffer zone.

4. The computer-implemented method of claim 1, wherein:
- the interest zone includes an interior zone, and an intersection zone; and
- the method further comprises defining locations of the interest zone, the interior zone, and the intersection zone based on physical characteristics of the intersection.

5. The computer-implemented method of claim 1, wherein the movement characteristics of vehicles within the interest zone comprises:
- indications of location of the vehicles captured at set intervals.

6. The computer-implemented method of claim 1, wherein the movement characteristics of vehicles within the interest zone comprises:
- timestamped indications of location of the vehicles as the vehicles proceed along entry paths of the intersection.

7. The computer-implemented method of claim 1, wherein the identifying comprises:
- determining a plurality of entry paths that are travelled by vehicles through the intersection; and
- determining points of intersection of a given entry path with other entry paths.

8. The computer-implemented method of claim 1, wherein the identifying comprises:
- determining a right of way order of the vehicles within the interest zone, wherein the right of way order comprises an indication of an order of the vehicles should proceed through the intersection based on road rules and physical characteristics of the intersection.

9. The computer-implemented method of claim 8, wherein the identifying comprises:
- removing a vehicle from the right of way order and promoting vehicles lower in the order when a vehicle leaves the interest zone.

10. The computer-implemented method of claim 1, wherein identifying the first portion of the data associated with one or more identified assertive vehicles comprises:
- identifying asserting captures, wherein the asserting captures includes captures of movement characteristics of the assertive vehicle prior to the assertive vehicle arriving at the threshold position.

11. The computer-implemented method of claim 10, wherein identifying the first portion of the data associated with one or more identified assertive vehicles comprises:
- deriving characteristics from the asserting captures, wherein the characteristics are to be used as part of the first portion of the data, and to be used by the model to predict whether a given vehicle approaching an intersection is likely an assertive vehicle.

12. The computer-implemented method of claim 11, wherein the derived characteristics includes: a distance of the asserting vehicle to a stop line/edge of an intersection zone.

13. The computer-implemented method of claim 11, wherein the derived characteristics includes: a distance of the asserting vehicle to an edge of an interior zone.

14. The computer-implemented method of claim 11, wherein the derived characteristics includes one or more of: a speed of the asserting vehicle, and an acceleration of the asserting vehicle.

15. The computer-implemented method of claim 11, wherein the derived characteristics includes: whether the asserting vehicle had a lead vehicle.

16. The computer-implemented method of claim 11, wherein the derived characteristics includes: a difference in a time the assertive vehicle arrived at the intersection and an earliest time that one of the vehicles that had not arrived at the threshold position or left the interest zone arrived at the intersection.

17. The computer-implemented method of claim 11, wherein the derived characteristics includes: a right of way order of the vehicles.

18. One or more non-transitory computer-readable media having instructions stored thereon, wherein the instructions, in response to execution by a device, cause the device to:
- capture data representing surroundings of one or more autonomous vehicles, including physical characteristics of an intersection and movement characteristics of vehicles within an interest zone, wherein the interest zone corresponds to the intersection having stop indicators in at least two directions;
- identify a first portion of the data associated with one or more identified assertive vehicles and a second portion of the data associated with one or more identified non-assertive vehicles wherein identifying the first portion of the data associated with one or more identified assertive vehicles comprises
- identifying threshold positions of the intersection corresponding to positions where entry paths of the intersection crosses each other;
- identifying an order in which a plurality of identified vehicles is expected to cross the threshold position;
- identifying a first vehicle in the plurality of identified vehicles as an assertive vehicle responsive to the captured data indicating the first vehicle arrives at the threshold position prior to at least one other vehicle in the plurality of identified vehicles, where the at least one other vehicle has an earlier position in the order than the first vehicle;

generate a model to discriminate between assertive vehicles and non-assertive vehicles using the first portion of the data and the second portion of the data, wherein the model produces results that are consistent with the identifying step in identifying the one or more identified assertive vehicles and the one or more identified non-assertive vehicles from the captured data;

implement the model on an autonomous vehicle to discriminate between assertive and non-assertive vehicles; and cause the autonomous vehicle to take an action based on results of the implemented model.

19. A system, comprising:

a memory device to store data representing movement of vehicles within an interest zone, wherein the interest zone corresponds to an intersection having stop indicators in at least two directions; and a processing device coupled to the memory device, the processing device configured to:

receive data representing surroundings of one or more autonomous vehicles, including physical characteristics of an intersection and movement characteristics of vehicles within an interest zone, wherein the interest zone corresponds to the intersection having stop indicators in at least two directions;

identify a first portion of the data associated with one or more identified assertive vehicles and a second portion of the data associated with one or more identified non-assertive vehicles, wherein identifying the first portion of the data associated with one or more identified assertive vehicles comprises identifying threshold positions of the intersection corresponding to positions where entry paths of the intersection crosses each other;

identifying an order in which a plurality of identified vehicles is expected to cross the threshold position;

identifying a first vehicle in the plurality of identified vehicles as an assertive vehicle responsive to the captured data indicating the first vehicle arrives at the threshold position prior to at least one other vehicle in the plurality of identified vehicles, where the at least one other vehicle has an earlier position in the order than the first vehicle;

generate a model to discriminate between assertive vehicles and non-assertive vehicles using the first portion of the data and the second portion of the data, wherein the model produces results that are consistent with the identifying step in identifying the one or more identified assertive vehicles and the one or more identified non-assertive vehicles from the received data; and cause the model to be implemented on an autonomous vehicle to discriminate between assertive and non-assertive vehicles; and cause the autonomous vehicle to take an action based on results of the implemented model.

* * * * *